US009703969B2

United States Patent
Kyoo

(10) Patent No.: US 9,703,969 B2
(45) Date of Patent: Jul. 11, 2017

(54) IMAGE FORMING SYSTEM, SERVICE PROVIDING SERVER, INFORMATION PROCESSING TERMINAL, IMAGE FORMING DEVICE AND NON-TRANSITORY COMPUTER READABLE RECORDING MEDIUM

(71) Applicant: Konica Minolta, Inc., Tokyo (JP)

(72) Inventor: Shunsaku Kyoo, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/672,765

(22) Filed: Mar. 30, 2015

(65) Prior Publication Data

US 2015/0293732 A1  Oct. 15, 2015

(30) Foreign Application Priority Data

Apr. 10, 2014 (JP) ................................ 2014-080717

(51) Int. Cl.
*G06F 21/60* (2013.01)
*H04L 29/08* (2006.01)

(52) U.S. Cl.
CPC .......... *G06F 21/608* (2013.01); *H04L 67/125* (2013.01)

(58) Field of Classification Search
CPC .................................................. G06F 3/1238
USPC .............................................. 358/1.14, 1.15
See application file for complete search history.

(56) References Cited

U.S. PATENT DOCUMENTS

| 6,115,132 A * | 9/2000 | Nakatsuma | G06F 3/1205 358/1.14 |
| 2004/0170460 A1* | 9/2004 | Mokuya | G06F 3/121 400/76 |
| 2012/0206757 A1* | 8/2012 | Kawabata | H04L 67/02 358/1.14 |

(Continued)

FOREIGN PATENT DOCUMENTS

| JP | 2006-168069 A | 6/2006 |
| JP | 2006-295466 A | 10/2006 |

(Continued)

OTHER PUBLICATIONS

Office action from corresponding Japanese patent application No. 2014-080717 (with English translation), Mar. 22, 2016, 7 pgs, mailed from Japanese Patent Office, Japan.

*Primary Examiner* — Jacky X Zheng
(74) *Attorney, Agent, or Firm* — Baker & Hostetler LLP

(57) ABSTRACT

An image forming system comprises a service providing server and an image forming device. The service providing server includes a managing part configured to manage user registration information with which a service user who uses a service with the image forming device and the image forming device associated with each other are registered, a ticket issuing part configured to issue an application delete ticket to delete an application installed in advance on the image forming device when the service user terminates the service, and a ticket sending part configured to send the ticket to a device which has accessed the service providing server when the access from the service user is detected. The image forming device includes a ticket receiving part configured to receive the ticket from the service providing server, and an application deleting part configured to delete the application based on the ticket.

22 Claims, 17 Drawing Sheets

(56) References Cited

U.S. PATENT DOCUMENTS

2012/0218599 A1* 8/2012 Kashioka .............. G06F 3/1222
        358/1.15
2013/0077125 A1* 3/2013 Kitagata ............... G06F 3/1204
        358/1.14

FOREIGN PATENT DOCUMENTS

| JP | 2008-242660 A | 10/2008 |
| JP | 2011-164789 A | 8/2011 |

* cited by examiner

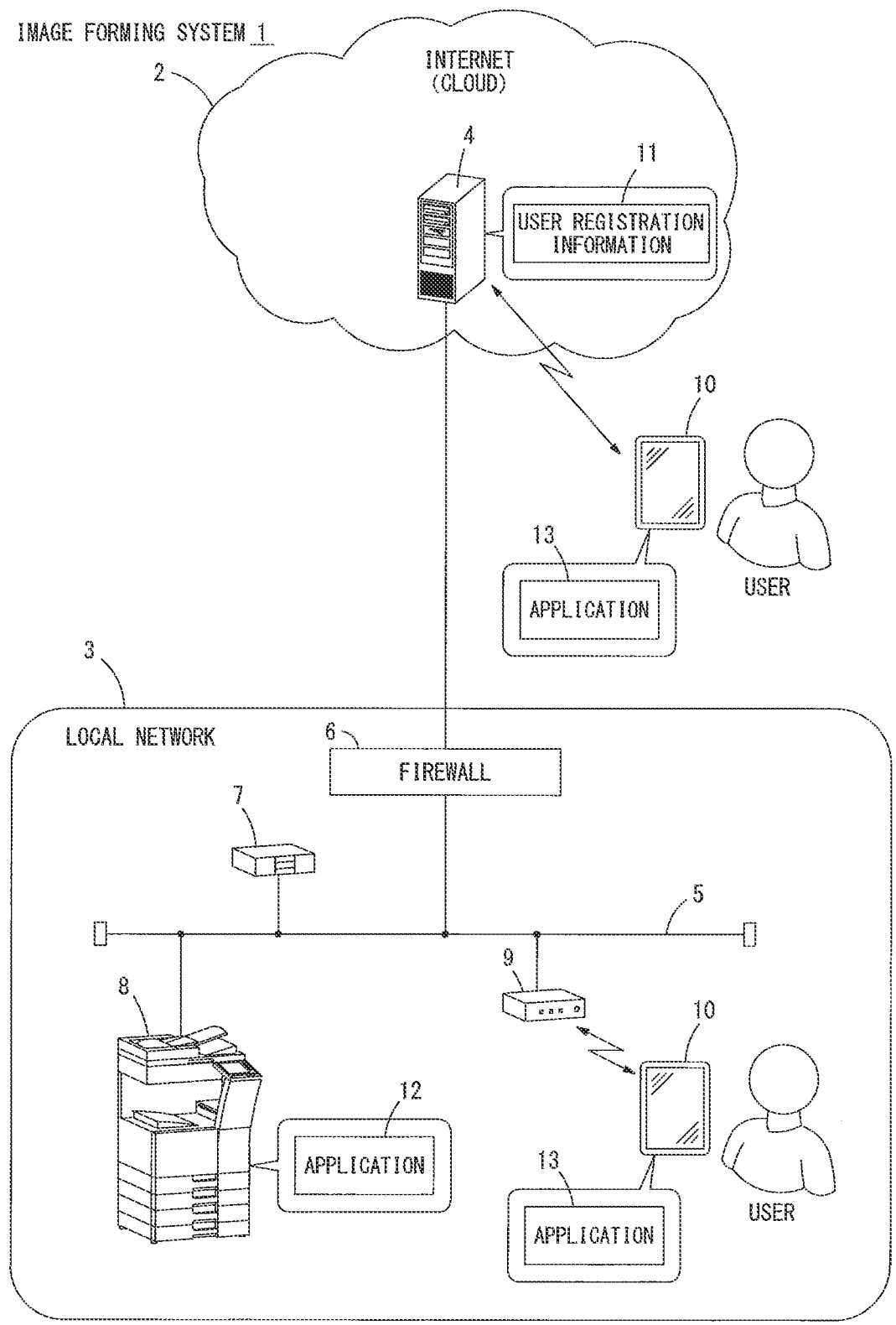

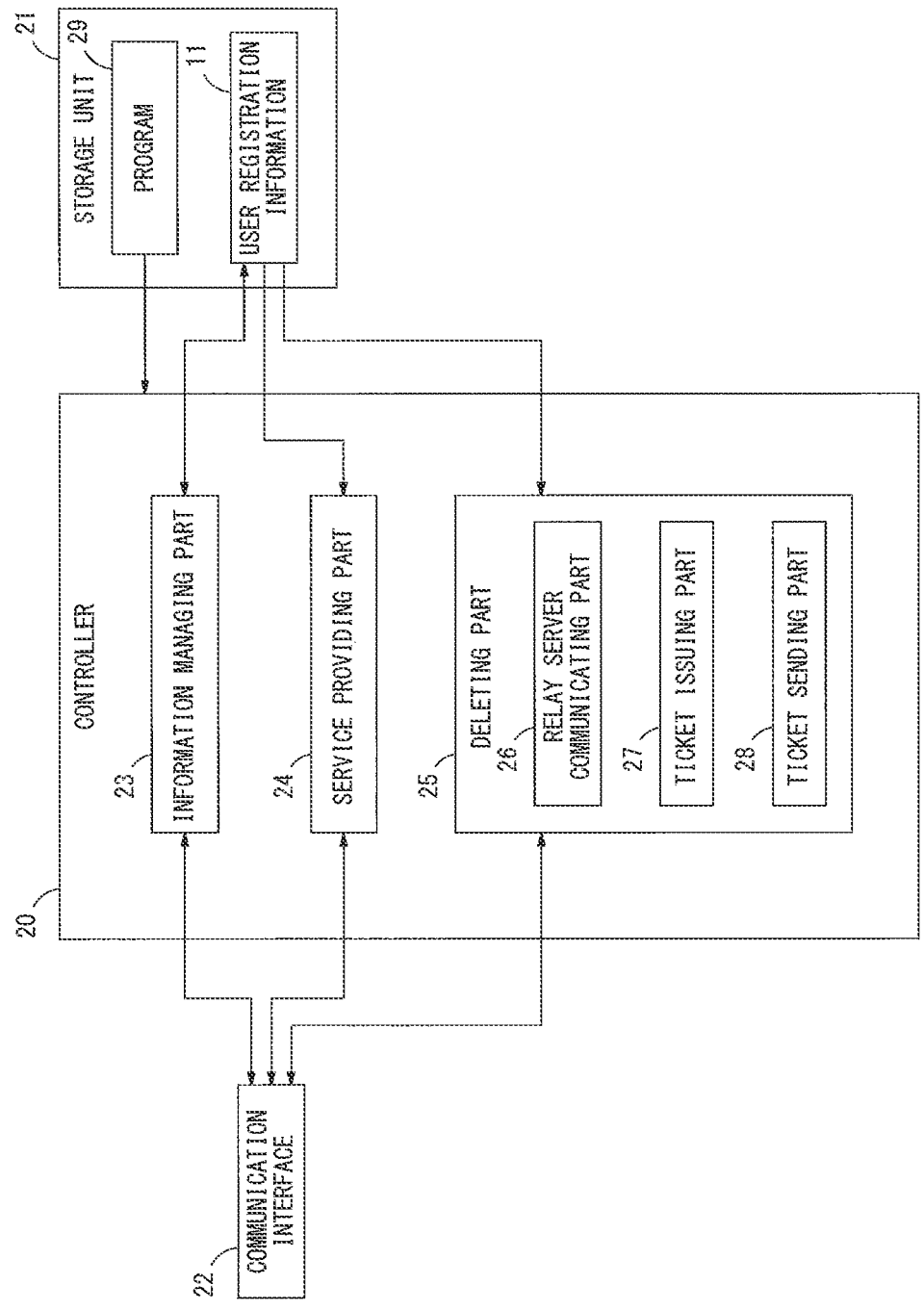

FIG. 3

USER REGISTRATION INFORMATION 11

| CONTRACTOR | USER INFORMATION USER | IMAGE FORMING DEVICE INFORMATION (IP ADDRESS) | RELAY SERVER INFORMATION (IP ADDRESS) | USAGE INFORMATION (DETAIL OF CONTRACT) | APPLICATION INFORMATION | TICKET MANAGEMENT INFORMATION |
|---|---|---|---|---|---|---|
| COMPANY A | UserA@###.com | 192.168.0.220 | 192.168.0.180 | CONTINUING | INSTALLED | UNNECESSARY |
| | UserB@###.com | | | CONTINUING | | UNNECESSARY |
| | UserC@###.com | | | CONTINUING | | UNNECESSARY |
| COMPANY B | UserD@###.com | 10.128.0.110 | 10.128.0.120 | TERMINATE AFTER OCT 2013 | DELETION FAILED (2013/10/1) | ISSUANCE REQUIRED |
| | UserE@###.com | | | TERMINATE AFTER OCT 2013 | DELETION FAILED (2013/10/1) | ISSUANCE REQUIRED |
| | UserF@###.com | | | TERMINATE AFTER OCT 2013 | DELETION FAILED (2013/10/1) | ISSUANCE REQUIRED |
| COMPANY C | ... | ... | | ... | ... | ... |
| COMPANY D | ... | ... | | ... | ... | ... |

11a  11b  11c  11d  11e  11f

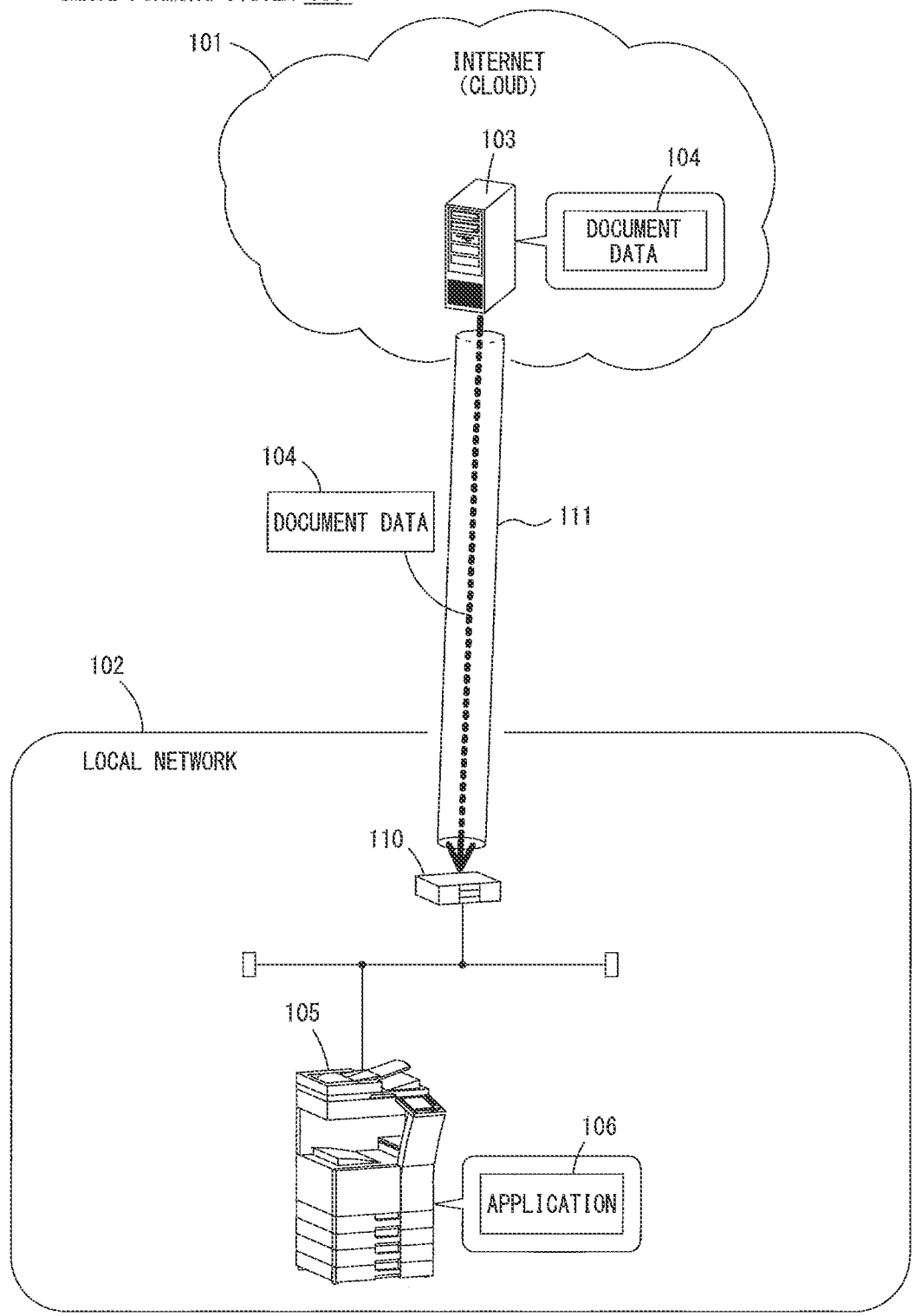

IMAGE FORMING SYSTEM, SERVICE PROVIDING SERVER, INFORMATION PROCESSING TERMINAL, IMAGE FORMING DEVICE AND NON-TRANSITORY COMPUTER READABLE RECORDING MEDIUM

This application is based on the application No. 2014-080717 filed in Japan, the contents of which are hereby incorporated by reference.

BACKGROUND OF THE INVENTION

Field of the Invention

The present invention relates to an image forming system, a service providing server, an information processing terminal, an image forming device and a non-transitory computer readable recording medium.

Description of the Background Art

In recent years, service providing servers have been installed on a cloud on an internet, and various types of cloud services have been provided over the internet. The cloud services include software services which allow document edit or data processing on the cloud by running a variety of programs on the service providing server besides storage services allowing management of data such as document data, for instance, by storing the data in the service providing server. Users are allowed to access the cloud service at anytime and anywhere as long as they are able to go online, resulting in enhanced user-friendliness. As an example of a way to use the cloud service, the user is allowed to access the service providing server via an information processing terminal such as a smart phone or a tablet terminal at outside, and send documents data, for instance, stored in the service providing server to an image forming device installed on an internal local network from the service providing server, thereby producing a printed output.

There is a firewall between the local network and the internet, so the data cannot be sent to the image forming device installed on the local network from the service providing server on the internet even when a print instruction is given by the user to the service providing server. In order to allow such data transmission, an image forming system as shown in FIG. 17 is introduced, for example.

A conventional image forming system 100 of FIG. 17 includes a service providing server 103 on an internet 101, an image forming device 105 and a relay server 110 on a local network 102 such as an internal LAN (Local Area Network). The relay server 110 relays communications between the image forming device 105 and the service providing server 103. When the relay server 110 is booted, for example, it establishes and maintains connection 111 with the service providing server 103 on the internet 101. As a result, the service providing server 103 is allowed to transmit and receive data to and from the relay server 110 on the local network 102 over the firewall established between the local network 102 and the internet 101. When detecting a user print instruction of document data 104, the service providing server 103 is allowed to send the document data 104 to the local network 102 using the connection 111 with the relay server 110, allowing a print job to be sent to the image forming device 105 via the relay server 110.

On the above-described conventional image forming system 100, the user operates the image forming device 105 to make the image forming device 105 access the service providing server 103, thereby using the cloud service. Thus, an application 106 to access the service providing server 103 to use the cloud service is installed in advance on the image forming device 105. The user boots the application 106 on the image forming device 105 so that he or she is allowed to use the cloud service with the image forming device 105.

The above-mentioned application 106 is installed on the image forming device 105 on the local network 102 of the service user when a service contract of the cloud service provided by the service providing server 103 is concluded, for instance. During the period the contract is in effect, the installed application 106 is remain.

In order to terminate the use of the cloud service, the service user applies to a service provider for termination of the service. The service provider deletes information relating to the service user who has applied for the service termination registered in user registration information. Also, the service provider deletes the application 106 installed on the image forming device 105 on the service user's local network 102. The service provider normally deletes the application 106 via a remote control over the internet using the connection 111 between the relay server 110 and the service providing server 103.

There may be a time lag between the time of submission of the service termination application by the service user and the deletion of the application 106 by the service provider. In such a case, when the service provider deletes the application 106, the relay server 110 has already been removed from the local network 102. The service provider then is not allowed to delete the application 106 installed on the image forming device 105 via a remote control over the internet. As a result, the unnecessary installed application 106 is remain on the image forming device 105 even after the cloud service is terminated, resulting in occupation of the image forming device 105's resource.

With regard to this problem, every information relating to a deleted user is conventionally deleted automatically when a process to delete the user registration is performed, for example, so that storage region is not unnecessarily occupied. This known technique is introduced for example in Japanese Patent Application Laid-Open No. JP 2006-168069 A. This known technique may be applied when the information relating to the service user who has applied the service termination is deleted from user registration information based on the service termination applied by the service user. Even with the known technique, if the relay server 110 has already been removed from the local network 102, the application 106 installed on the image forming device 105 still cannot be deleted from outside of the local network 2.

Hence, in order to delete the application 106 installed on the image forming device 105, the service provider is conventionally required to visit the installation site of the image forming device 105 and work to delete the application 106.

SUMMARY OF THE INVENTION

The present invention is intended to solve the above conventional problems. Thus, the present invention is intended to provide an image forming system, a service providing server, an information processing terminal, an image forming device and a non-transitory computer readable recording medium capable of deleting an application on the image forming device installed on a user's local network without requiring visit to an installation site of the image forming device at termination of a cloud service.

First, the present invention is directed to an image forming system.

According to an aspect of the image forming system, the image forming system comprises: a service providing server installed on an internet to provide a predetermined service; and an image forming device, installed on a local network connected to the internet via a firewall, store therein an application to use the service installed in advance. The service providing server includes: a managing part configured to manage user registration information with which a service user who uses the service with the image forming device and the image forming device corresponding to the service user associated with each other are registered; a ticket issuing part configured to issue an application delete ticket to delete the application installed in advance on the image forming device when the service user registered with the user registration information terminates the service; and a ticket sending part configured to send the application delete ticket to a device which has accessed the service providing server when the access from the service user, who is registered as the one who has terminated the service with the user registration information, is detected. The image forming device includes: a ticket receiving part configured to receive directly or indirectly the application delete ticket from the service providing server; and an application deleting part configured to delete the application based on the application delete ticket received by the ticket receiving part.

Second, the present invention is directed to a service providing server installed on an internet to provide a predetermined service.

According to an aspect of the service providing server, the service providing server comprises: a managing part configured to manage user registration information with which a service user and an image forming device, installed on a local network connected to the internet via a firewall and store therein an application to use the service installed in advance, associated with each other are registered; a ticket issuing part configured to issue an application delete ticket to delete the application installed in advance on the image forming device associated with the service user when he or she registered with the user registration information terminates the service; and a ticket sending part configured to send the application delete ticket to a device which has accessed the service providing server when the access from the service user, who is registered as the one who has terminated the service with the user registration information, is detected.

Third, the present invention is directed to an information processing terminal capable of causing a service providing server and an image forming device to work together. The service providing server is installed on an internet to provide a predetermined service. The image forming device, installed on a local network connected to the internet via a firewall, stores therein an application to use the service installed in advance.

According to an aspect of the information processing terminal, the information processing terminal comprises: a server connecting part configured to access the service providing server by connecting to the internet based on a user instruction; a storage part configured to store therein an application delete ticket to delete the application in response to receiving an application delete ticket from the service providing server after the server connecting part accesses the service providing server; and a sending part configured to send the application delete ticket in the storage part to the image forming device over the local network in response to detecting the communication with the image forming device over the local network is allowed.

Forth, the present invention is directed to an image forming device installed on a local network connected to an internet via a firewall.

According to an aspect of the image forming device, the image forming device comprises: a storage part configured to store therein an application installed in advance to use a service provided by a service providing server installed on the internet; a ticket receiving part configured to receive directly or indirectly an application delete ticket to delete the application stored in the storage part from the service providing server; and an application deleting part configured to delete the application stored in the storage part based on the application delete ticket received by the ticket receiving part.

Forth, the present invention is directed to a non-transitory computer readable recording medium on which a program is recorded. The program is executable on a service providing server installed on an internet to provide a predetermined service.

According to an aspect of the non-transitory computer readable recording medium, the program causing the service providing server to execute the steps of: (a) managing user registration information with which a service user and an image forming device, installed on a local network connected to the internet via a firewall and store therein an application to use the service installed in advance, associated with each other are registered; (b) issuing an application delete ticket to delete the application installed in advance on the image forming device associated with the service user when he or she registered with the user registration information terminates the service; and (c) sending the application delete ticket to a device which has accessed the service providing server when the access from the service user, who is registered as the one who has terminated the service with the user registration information, is detected.

Fifth, the present invention is directed to a non-transitory computer readable recording medium on which a program is recorded. The program is executable on an information processing terminal causing a service providing server installed on an internet to provide a predetermined service and an image forming device, installed on a local network connected to the internet via a firewall, store therein an application to use the service installed in advance, work together.

According to an aspect of the non-transitory computer readable recording medium, the program causing the information processing terminal to execute the steps of: (a) accessing the service providing server by connecting to the internet based on a user instruction; (b) storing an application delete ticket to delete the application in a predetermined storage part in response to receiving the application delete ticket from the service providing server after gaining the access the service providing server in step (a); and (c) sending the application delete ticket stored in the storage part to the image forming device over the local network in response to detecting the communication with the image forming device over the local network is allowed.

Sixth, the present invention is directed to a non-transitory computer readable recording medium on which a program is recorded. The program is executable on an image forming device installed on a local network connected to an internet via a firewall.

According to an aspect of the non-transitory computer readable recording medium, the program causing the image forming device to execute the steps of: (a) storing in a predetermined storage part an application installed in advance to use a service provided by a service providing server installed on the internet; (b) receiving directly or indirectly an application delete ticket to delete the application stored in step (a) from the service providing server; and (c) deleting the application stored in step (a) based on the application delete ticket received in step (b).

BRIEF DESCRIPTION OF THE DRAWINGS

FIG. 1 shows an exemplary configuration of an image forming system;

FIG. 2 is a block diagram showing an exemplary hardware configuration and functional configuration of a service providing server;

FIG. 3 is an example of user registration information;

FIG. 17 shows an exemplary configuration of a conventional image forming system.

DESCRIPTION OF THE PRESENT PREFERRED EMBODIMENTS

Figure 4:
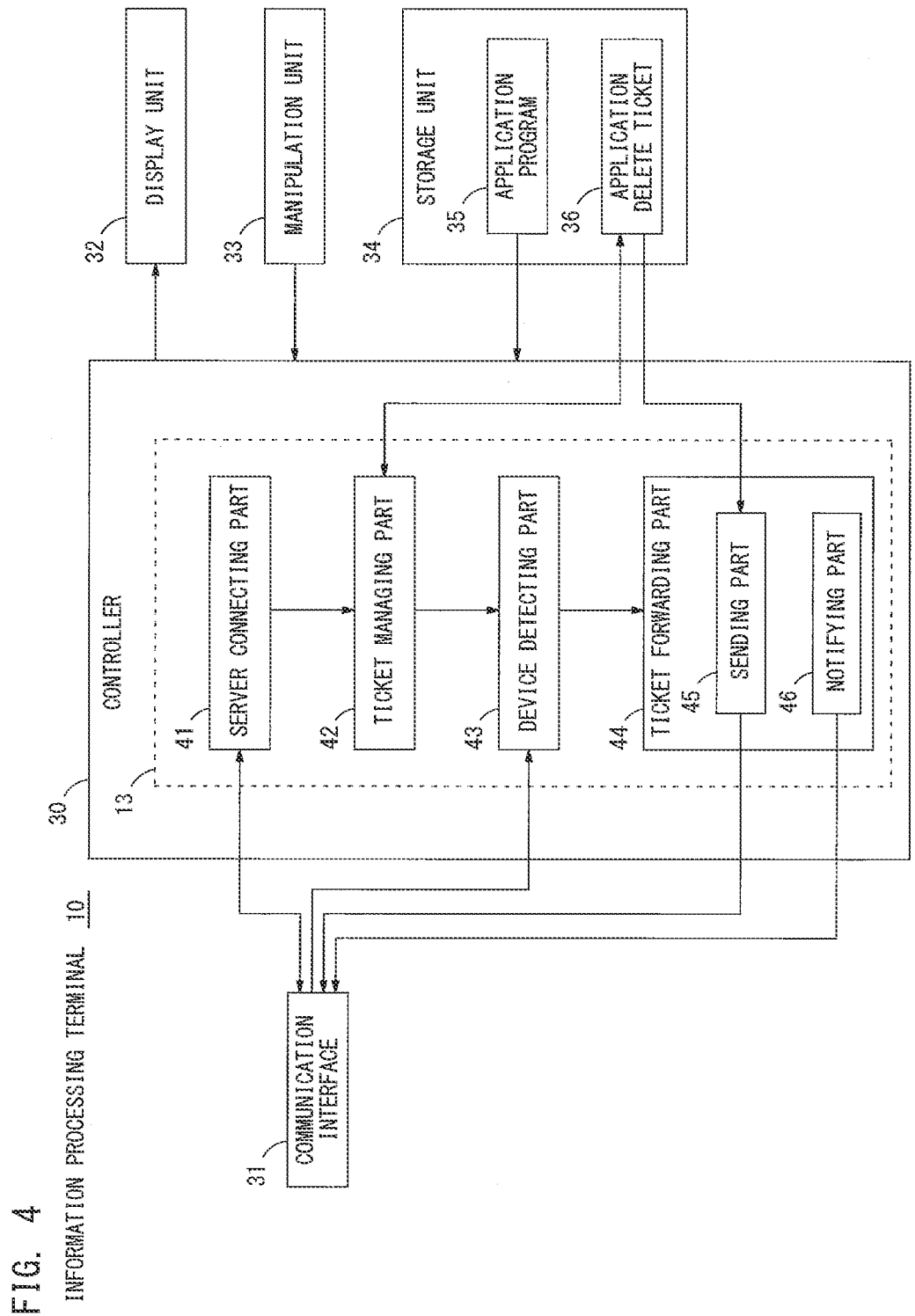
FIG. 4 is a block diagram showing an exemplary hardware configuration and functional configuration of an information processing terminal.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an image forming system 1 of the present preferred embodiment of the present invention. The image forming system 1 is a network system in which an internet 2 and a local network 3 such as an internal LAN 5 are connected to each other via a firewall 6. A service providing server 4 is installed on the internet 2, and the firewall 6, a relay server 7, an image forming device 8, a wireless communication device 9 and an information processing terminal 10 are installed on the local network 3 of the image forming system 1.

The service providing server 4 is a server which provides a variety of services (cloud services) over the internet 2 including storage services, software services and job cooperative services. The storage services are to store data such as document data, for instance, and manage. The software services are to allow document edit or data processing on the cloud by running a variety of programs. The job cooperative services are to establish communication with the image forming device 8 installed on the local network 3 and cause the image forming device 8 to execute a job. Although in FIG. 1, only one server is shown as the service providing server 4, there may be multiple servers and the servers may work together to provide the predetermined services. The service providing server 4 stores therein user registration information 11 with which information relating to a service user who uses the cloud service is registered in advance. In response to detecting an access from a user, the service providing server 4 performs user authentication based on the user registration information 11. If the user is allowed to use the cloud service, the service providing server 4 authorizes the user login, thereby providing the cloud service available for the logged-in user.

The firewall 6 is an interface which connects the local network 3 such as the internal LAN 5 with the internet 2. The firewall 4 allows communication between devices installed on the local network 3 and the server installed on the internet 2 when the devices access the server. When the devices on the local network 3 do not access the server on the internet 2, the firewall 6 terminates the accesses from the server on the internet 2 to the local network 3.

The relay server 7 is a gateway server which relays communication between the image forming device 8 and the service providing server 4. The relay server 7 is installed on the local network 3 for providing the job cooperative services of the services provided by the service providing server 4. The relay server 7 establishes connection with the service providing server 4 installed on the internet 2 via the firewall 6 when it is powered on and booted. Thus, the service providing server 4 is allowed to send a variety of data including a print job to the relay server 7 on the local network 3 over the firewall 6 from the internet 2. In response to receiving data addressed to the image forming device 8 from the service providing server 4 as being connected to the service providing server 4, the relay server 7 sends the received data to the image forming device 8.

The image forming device 8 is formed from a device such as one of MFPs (Multi-functional peripherals) equipped with functions such as print function and scan function, for instance. The image forming device 8 executes the print job based on the data, for instance, received over the local network 3, thereby producing a printed output. The image forming device 8 stores therein an application 12 installed in advance to use the service provided by the service providing server 4. The application 12 adds a function to execute the job by working together with the service providing server 4 to the image forming device 8. By running the application 12, for example, the image forming device 8 accesses the service providing server 4 and logs into it. The image forming device 8 is then allowed to download data such as the document data from the service providing server 4, thereby producing the printed output. Also, by running the application 12, the image forming device 8 is capable of uploading image data obtained by reading the document with scan function and store the data in the service providing server 4.

The wireless communication device 9 establishes communication which is compliant with wireless LAN standards, for example. The wireless communication device 9 is equipped with a function to establish communication with various types of devices equipped with radio communication function and cause the devices to connect to the local network 3.

The information processing terminal 10 is a device formed from a smart phone or a tablet terminal, for instance, which is equipped with an information processing function. The information processing terminal 10 is owned by an individual user. The information processing terminal 10 is used not only under the local network 3 but also on the go. That is because it is easy for the user to carry around the information processing terminal 10 and use the device on the go. The information processing terminal 10 is equipped with multiple types of wireless communication functions including, for example, a first wireless communication function which is compliant with wireless LAN standards and a second wireless communication function which is compliant with communication standards for cell phones. The information processing terminal 10 establishes communication by the first wireless communication function with the wireless communication device 9 if it is under the local network 3, thereby connecting to the local network 3. Also, the information processing terminal 10 is allowed to connect to the internet 2 via the local network 3 in such a case. When the information processing terminal 10 goes outside of a communication available area with the wireless communication device 9 and is not under the local network 3, it is capable of connecting to the internet 2 by the second wireless communication function which is compliant with communication standards for the cell phones.

The information processing terminal 10 stores therein an application 13 installed in advance to use the service provided by the service providing server 4 and to send a job to the image forming device 8. The application 13 adds a function to cause the service providing server 4 and the image forming device 8 to work together and cause the image forming device 8 to execute the job to the information processing terminal 10. By running the application 13, for example, the information processing terminal 10 accesses the service providing server 4 and logs into it. The information processing terminal 10 then is allowed to use the service provided by the service providing server 4. The information processing terminal 10 runs the application 13, thereby specifying the data such as the document data stored in the service providing server 4 and giving a print instruction.

After receiving the print instruction from the information processing terminal 10, the service providing server 4 identifies the image forming device 8 associated with a logged-in user in the user registration information 11, and sends a print job to the image forming device 8. The service providing server 4 sends the print job using the connection established by the relay server 7, thereby sending the print job to the image forming device 8 via the relay server 7.

The application 13 installed on the information processing terminal 10 is not only capable of causing the service providing server 4 to send the print job to the image forming device 8 but also generating the print job based on the data such as the document data stored in the information processing terminal 10 and sending the generated print job to the image forming device 8 over the local network 3.

On the aforementioned image forming system 1, when the service user applies the service termination, the user registration information 11 managed at the service providing server 4 is updated. After the date and time the cloud service becomes unavailable for the service user elapses, the service providing server 4 performs a delete process to access the image forming device 8 in the local network 3 by using the connection established by the relay server 7 and delete the application 12 installed on the image forming device 8. The relay server 7 may have already been removed from the local network 3 by the user who has applied the service termination. In such a case, the delete process by the service providing server 4 is failed.

The service termination application by the service user is generally sent by some users such as a system administrator of the local network 3, for instance. The other users often forget the service termination date and time of the cloud service, and they access the service providing server 4 even after the service termination date and time.

When the service termination application for the job cooperative service is sent by the service user, he or she may continue to use the other services. In such a case, the service user continues accessing the service providing server 4 to use the other services even after the job cooperative service is terminated.

When the delete process at the service providing server 4 is failed, the image forming system 1 of the present preferred embodiment is configured to delete the application 12 installed on the image forming device 8 by using another method. The detailed configuration and operations of the image forming system 1 are described next.

The service providing server 4 is described first. FIG. 2 is a block diagram showing an exemplary hardware configuration and functional configuration of the service providing server 4. The service providing server 4 includes a controller 20, a storage unit 21 and a communication interface 22. The controller 20 is formed from a CPU and a memory, and the storage unit 21 is formed from a device such as a hard disk drive (HDD). The communication interface 22 establishes communication with the information processing terminal 10 and each device installed on the local network 3. The CPU reads and executes a program 29 in the storage unit 21 so that the controller 20 serves as an information managing part 23, a service providing part 24 and a deleting part 25.

The information managing part 23 stores the user registration information 11 in the storage unit 21 and manages the information. The service user who uses the service provided by the service providing server 4, for example, is associated with the image forming device 8 used by the corresponding user, and the service user and the corresponding image forming device 8 are registered with the user registration information 11. In response to receiving the information relating to the service user input by the service provider via the communication interface 22, for instance, the information managing part 23 registers the information with the user registration information 11 and updates the user registration information 11.

FIG. 3 is an example of the user registration information 11. The user registration information 11 includes user information 11a, image forming device information 11b, relay server information 11c, usage information 11d, application information 11e and ticket management information 11f. The user information 11a relates to the service user, and includes information relating to a contractor such as a company that uses the service, for example, and information relating to an individual user who is attached to the contractor such as the company and actually uses the service. The information relating to the contractor includes, for example, a contractor ID as identification information to identify the contractor. The information relating to the individual user includes, for example, a user ID as identification information to identify the individual user. In the example of FIG. 3, an email address of the individual user is registered as the user ID. The image forming device information 11b relates to the image forming device 8 used by the service user, and is information such as an IP address of the image forming device 8 installed on the local network 3 of the service user. The relay server information 11c relates to the relay server 7 installed on the local network 3 of the service user, and is information such as an IP address of the relay server 7. The usage information 11d shows the service contract with the service user, and shows whether or not the service is available for the service user. The application information 11e shows a status of the application 12 installed on the image forming device 8. The ticket management information 11f shows the necessity of issuance of an application delete ticket to delete the application 12 installed on the image forming device 8.

In response to receiving the information relating to the new service user, for example, the information managing part 23 registers new information corresponding to each item in the user registration information 11 based on the received information, and updates the user registration information 11. After receiving user termination information based on the service termination application by the service user, the information managing part 23 registers the service termination date and time as the usage information 11d based on the received information.

When detecting the access to use the service via the communication interface 22, the service providing part 24 performs user authentication with the user registration information 11 to determine whether or not the accessed user is authorized to use the service. The accessed user may be a user who is officially registered as the service user with the user registration information 11. In such a case, the service providing part 24 allows the log-in by the registered user, and provides with the service specified in advance. The registered user may access after the service termination date and time registered with the user registration information 11. In this case, the service providing part 24 does not allow the log-in. If the accessed user is not the user officially registered with the user registration information 11, the service providing part 24 does not allow the log-in either.

The deleting part 25 is put into operation when the information relating to the service termination is registered as the usage information 11d of the user registration information 11 and information showing that the application 12 has been installed is recorded as the application information 11e. The deleting part 25 performs the process to delete the application 12 installed on the image forming device 8 after the service termination date and time. The deleting part 25 includes a relay server communicating part 26, a ticket issuing part 27 and a ticket sending part 28.

The relay server communicating part 26 starts communication with the relay server 7 installed on the local network 3 of the user who has terminated the service based on the relay server information 11c and performs the process to delete the application 12 installed on the image forming device 8 via the relay server 7 after the service termination date and time registered as the usage information 11d of the user registration information 11. The relay server 7 may still be installed on the local network 3. In such a case, the service providing server 4 is connecting to the relay server 7. The relay server communicating part 26 establishes communication with the image forming device 8 via the relay server 7, thereby normally deleting the application 12 installed on the image forming device 8. After the application 12 installed on the image forming device 8 is deleted normally, the relay server communicating part 26 records the information showing that the delete process is complete as the application information 11e of the user registration information 11. This time, the deleting part 25 is allowed to complete the process to delete the application 12 without putting the ticket issuing part 27 and the ticket sending part 28 into operation. The information managing part 23 deletes the information relating to the service user who has terminated the service from the user registration information 11 after the information showing that the delete process is complete is recorded as the application information 11e.

The relay server 7 may have already been removed from the local network 3 when the relay server communicating part 26 tries to delete the application 12 on the image forming device 8 by using the connection with the relay server 7. In such a case, the relay server communicating part 26 fails the process to delete the application 12. The relay server communicating part 26 then records information showing failure of the delete process as the application information 11e of the user registration information 11 and information showing that the issuance of the application delete ticket is necessary as the ticket management information 11f. The ticket issuing part 27 and the ticket sending part 28 are then brought into operation at the deleting part 25.

When the service is terminated by the service user registered with the user registration information 11, the ticket issuing part 27 issues the application delete ticket to delete the application installed on the image forming device 8. It is assumed that, for example, the service providing part 24 does not allow the log-in of the registered user because it has detected his or her access after the service termination date and time registered as the usage information 11d. In this case, the service providing part 24 notifies the deleting part 25 of the information. The information showing the failure of deletion may be recorded as the application information 11e of the user registration information 11, and the information showing that the issuance of the application delete ticket is necessary may be recorded as the ticket management information 11f. The deleting part 25 then brings the ticket issuing part 27 into operation to issue the application delete ticket.

The application delete ticket is electric data which contains a command to delete the application 12 installed on the image forming device 8. The application delete ticket includes an uninstall program to delete the application 12. The uninstall program is executable on the image forming device 8 as required on which the application 12 to delete is installed, and it is executed on the image forming device 8 so that the application 12 is deleted. The uninstall program to delete the application 12 may not be stored in advance on the image forming device 8, for example. The ticket issuing part 27 then may generate the application delete ticket with which the uninstall program is attached. When the application delete ticket is sent to the information processing terminal 10 and the uninstall program to delete the application 12 may be attached at the information processing terminal 10, the ticket issuing part 27 is not required to generate the application delete ticket with which the uninstall program is attached.

After the application delete ticket is generated by the ticket issuing part 27, the deleting part 25 then brings the ticket sending part 28 into operation. The ticket sending part 28 sends the application delete ticket issued by the ticket issuing part 27 to the device which has gained the access and is not allowed to log-in. The user, for example, may have an access to the service providing server 4 via the information processing terminal 10. In this case, the application delete ticket is sent to the information processing terminal 10. The user, for example, may have an access to the service providing server 4 by using the image forming device 8. In this case, the application delete ticket is sent to the image forming device 8. To be more specific, when the application 12 on the image forming device 8 is not allowed to be deleted via the relay server 7, the service providing server 4 sends the application delete ticket to the device which has gained the access at the time of detection of the next access from the user who has terminated the service.

The information processing terminal 10 is described next. FIG. 4 is a block diagram showing an exemplary hardware configuration and functional configuration of the information processing terminal 10. The information processing terminal 10 includes a controller 30, a display unit 32, a manipulation unit 33, a storage unit 34 and a communication interface 31. The controller 30 is formed from a CPU and a memory. The display unit 32 is formed from a device such as a color liquid crystal display, for example, and the manipulation unit 33 is formed with parts such as touch panel sensors arranged on the screen of the display unit 32, for example. The storage unit 34 is formed from a device such as a solid state drive (SSD), for instance, and the communication interface 31 establishes communication with other devices with the aforementioned various types of wireless communication functions. The CPU reads and executes an application program 35 installed in advance in the storage unit 34 so that the controller 30 is allowed to use the service provided by the service providing server 4 and brings the application 13 into operation to send the job to the image forming device 8. The application 13 includes a server connecting part 41, a ticket managing part 42, a device detecting part 43 and a ticket forwarding part 44.

The server connecting part 41 accesses the service providing server 4 installed on the internet 2 via the communication interface 31 and performs a process to use the service provided by the service providing server 4 based on user instruction. In response to having the access to the service providing server 4, the server connecting part 41 sends the information such as the contractor ID or the user ID to the service providing server 4. Thus, the user authentication is performed at the service providing server 4. As a result of the user authentication, the log-in may be allowed at the service providing server 4. In this case, the server connecting part 41 receives a screen to use the service from the service providing server 4 and displays the received screen on the display unit 32. After user operation is detected via the manipulation unit 33, the server connecting part 41 sends the information based on the operation to the service providing server 4, thereby causing the service providing server 4 to perform the process based on the user operation.

The service provided to the user may be terminated when the server connecting part 41 has the access to the service providing server 4. In this case, the server connecting part 41 may receive the application delete ticket from the service providing server 4. The server connecting part 41 then brings the ticket managing part 42 into operation.

The ticket managing part 42 stores an application delete ticket 36 in the storage unit 34 and manages the ticket when the application delete ticket 36 is received from the service providing server 4 after the server connecting part 41 has the access to the service providing server 4. After the ticket managing part 42 stores the application delete ticket 36 in the storage unit 34, the device detecting part 43 is brought into operation next.

The communication interface 31 allows the communication with the wireless communication device 9, and it is detected that the information processing terminal 10 is connected to the local network 3. The device detecting part 43 is then establishes communication with the image forming device 8 over the local network 3, and detects the image forming device 8 on which the application 12 to delete is installed. The ticket forwarding part 44 is brought into operation if the image forming device 8 is detected by the device detecting part 43.

The ticket forwarding part 44 forwards the application delete ticket 36 stored in the storage unit 34 to the image forming device 8 installed on the local network 3. The ticket forwarding part 44 includes a sending part 45 and a notifying part 46. The sending part 45 is brought into operation first. The sending part 45 is brought into operation when it is allowed to establish communication with the image forming device 8 over the local network 3. The sending part 45 reads the application delete ticket 36 in the storage unit 34, and sends the read application delete ticket 36 to the image forming device 8 over the local network 3. The sending part 45 attaches the uninstall program to delete the application 12 to the application delete ticket 36 read from the storage unit 34 and sends to the image forming device 8, if necessary.

The sending part 45 may send the application delete ticket 36 to the image forming device 8 over the local network 3 when the device detecting part 43 had detected that the communication with the image forming device 8 is established, for example. In such a case, after the application delete ticket 36 is obtained from the service providing server 4 and it has detected that the communication with the image forming device 8 is allowed, the information processing terminal 10 immediately forwards the application delete ticket 36 to the image forming device 8. As a result, the application 12 installed on the image forming device 8 may be deleted rapidly.

The sending part 45 is not necessarily send the application delete ticket 36 to the image forming device 8 over the local network 3 at the aforementioned timing. The sending part 45 may be brought into operation when the job is given to the image forming device 8 over the local network 3 from the information processing terminal 10, and the application delete ticket 36 may be sent to the image forming device 8.

After the sending part 45 sends the application delete ticket 36 to the image forming device 8, the delete process of the application 12 is performed at the image forming device 8. After the delete process of the application 12 at the image forming device 8 is normally complete, and the notification informing that the delete process is complete is received from the image forming device 8, the notifying part 46 of the ticket forwarding part 44 is brought into operation. The notifying part 46 sends a deleted notification to the service providing server 4. In response to receiving the deleted notification from the notifying part 46, the service providing server 4 brings the information managing part 23 into operation to delete the information relating to the service user who has terminated the service from the user registration information 11.

Figure 5:
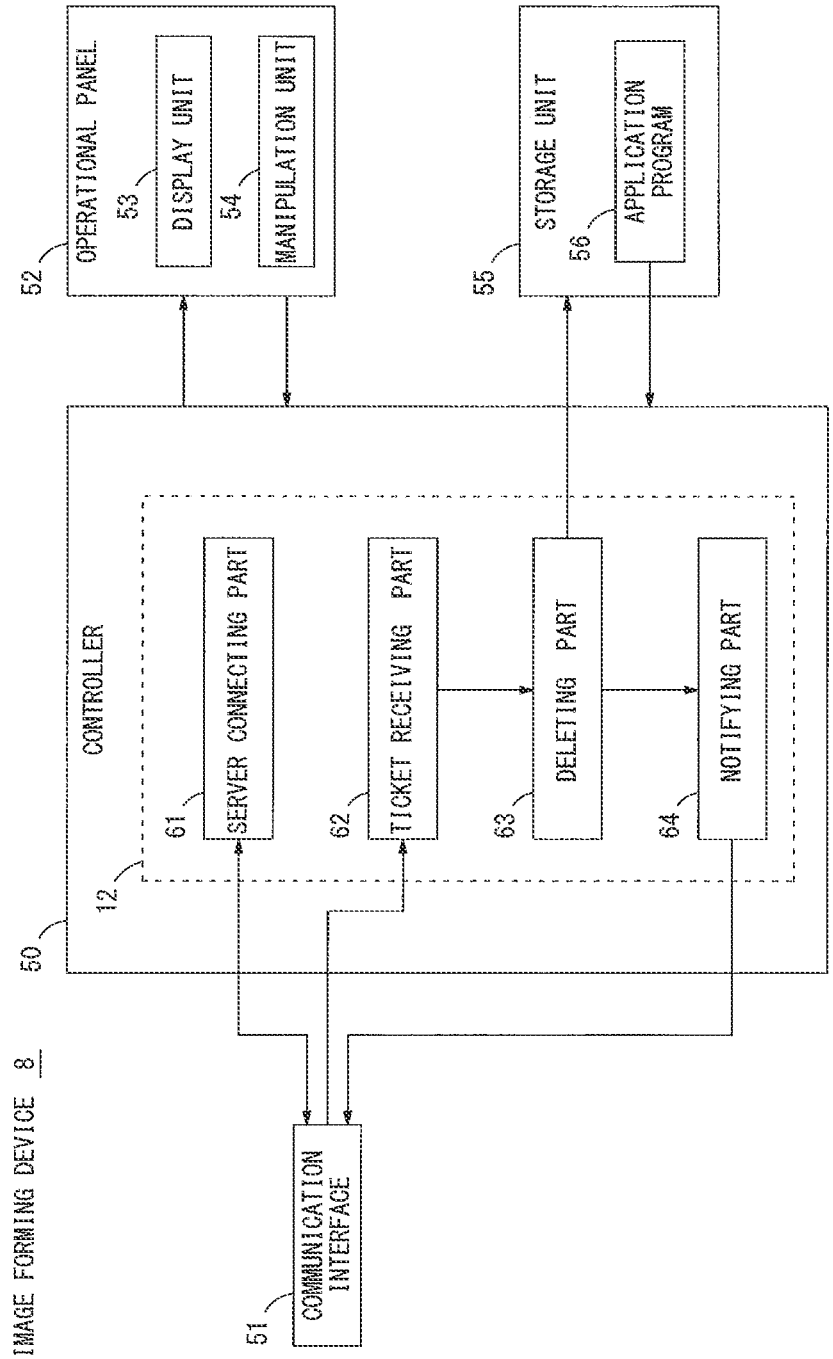
FIG. 5 is a block diagram showing an exemplary hardware configuration and functional configuration of an image forming device.

The image forming device 8 is described at last. FIG. 5 is a block diagram showing an exemplary hardware configuration and functional configuration of the image forming device 8. The image forming device 8 includes a controller 50, a communication interface 51, an operational panel 52 and a storage unit 55. The controller 50 is formed from a CPU and a memory, and the communication interface 51 establishes communication with other devices over the local network 3. The operational panel 52 is a user interface operable by the user in use of the image forming device 8, and the storage unit 55 is formed from a device such as a hard disk drive (HDD). The operational panel 52 includes a display unit 53 on which a variety of information is displayed to the user and a manipulation unit 54 receives user operation. The storage unit 55 stores therein an application program 56 installed in advance to bring the application 12 into operation.

The CPU reads and executes the application program 56 installed in advance in the storage unit 55 so that the controller 50 brings the application 12 into operation in order to use the service provided by the service providing server 4 and execute the job by working together with the service providing server 4. The application 12 includes a server connecting part 61, a ticket receiving part 62, a deleting part 63 and a notifying part 64.

The server connecting part 61 accesses the service providing server 4 installed on the internet 2 via the communication interface 51 and performs a process to use the service provided by the service providing server 4 based on user instruction. In response to having the access to the service providing server 4, the server connecting part 61 sends the information such as the contractor ID or the user ID received through the operational panel 52 to the service providing server 4. Thus, the user authentication is performed at the service providing server 4. As a result of the user authentication, the log-in may be allowed at the service providing server 4. In this case, the server connecting part 61 receives a screen to use the service from the service providing server 4 and displays the received screen on the display unit 53 of the operational panel 52. After user operation is detected via the manipulation unit 54, the server connecting part 61 sends the information based on the operation to the service providing server 4, thereby causing the service providing server 4 to perform the process based on the user operation.

The service provided to the user may have been terminated when the server connecting part 61 has the access to the service providing server 4. In this case, the communication interface 51 may receive the application delete ticket 36 from the service providing server 4. In this case, the ticket receiving part 62 receives the application delete ticket 36 from the service providing server 4. The communication interface 51 sometimes receives the application delete ticket 36 from the information processing terminal 10 over the local network 3 even when the server connecting part 61 is not operative. In also such case, the ticket receiving part 62 receives the application delete ticket 36 from the information processing terminal 10. More specifically, the ticket receiving part 62 not only receives the application delete ticket 36 directly from the service providing server 4 but also indirectly via the information processing terminal 10. After the application delete ticket 36 is received by the ticket receiving part 62, the deleting part 63 is brought into operation.

The deleting part 63 performs the process to delete the application 12 installed on the image forming device 8 based on the application delete ticket 36 received by the ticket receiving part 62. The deleting part 63 runs the uninstall program to delete the application program 56, thereby deleting the application 12. It is assumed, for example, the uninstall program is stored in advance in the storage unit 55. In this case, the deleting part 63 may read and execute the uninstall program in the storage unit 55. It is not necessarily that the deleting part 63 reads and executes the uninstall program in the storage unit 55. When the uninstall program is attached to the application delete ticket 36 received by the ticket receiving part 62, for instance, the deleting part 63 may run the attached uninstall program to delete the application 12. After completing the delete process of the application 12, the deleting part 63 brings the notifying part 64 into operation. The notifying part 64 may become operative when the uninstall program is run.

After the delete process of the application 12 is normally complete, the notifying part 64 notifies the service providing server 4 or the information processing terminal 10 that the delete process is complete. It is assumed, for example, the ticket receiving part 62 receives the application delete ticket 36 from the service providing server 4. In this case, the notifying part 64 notifies the service providing server 4 that the delete process is complete. When the ticket receiving part 62 receives the application delete ticket 36 from the information processing terminal 10. In this case, the notifying part 64 notifies the information processing terminal 10 that the delete process is complete. The notifying part 64 is not limited to notify either part. The notifying part 64 may notify the service providing server 4 that the delete process is complete in both cases when the ticket receiving part 62 receives the application delete ticket 36 from the service providing server 4 and the information processing terminal 10.

On the image forming system 1 configured as described above, the application 12 installed on the image forming device 8 is allowed to be deleted by any of the three ways described below when the delete process of the application 12 at the service providing server 4 is failed because the relay server 7 had already been removed from the local network 3.

Figure 6:
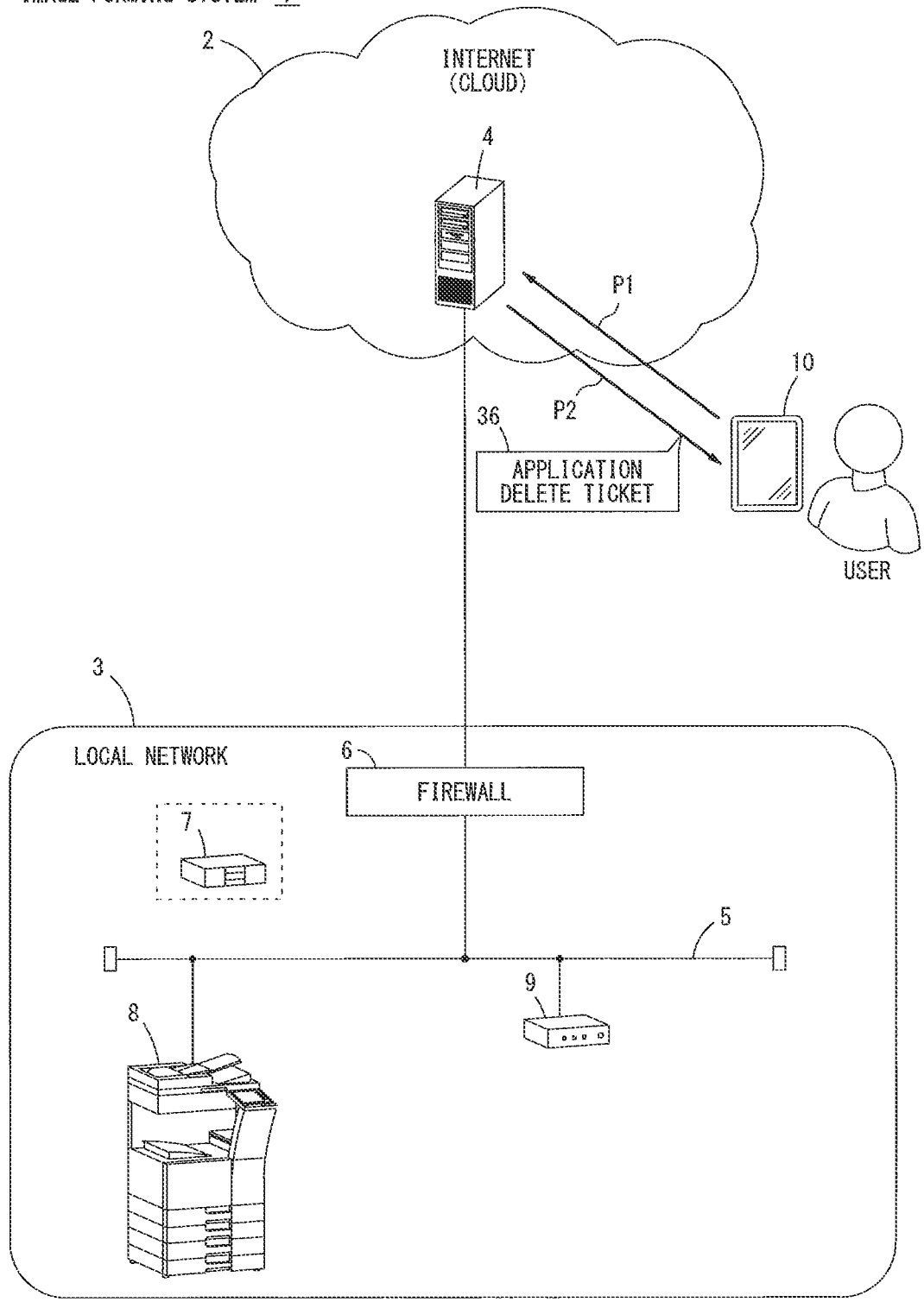
FIG. 6 explains a first method of deleting an application on the image forming device.
Figure 7:
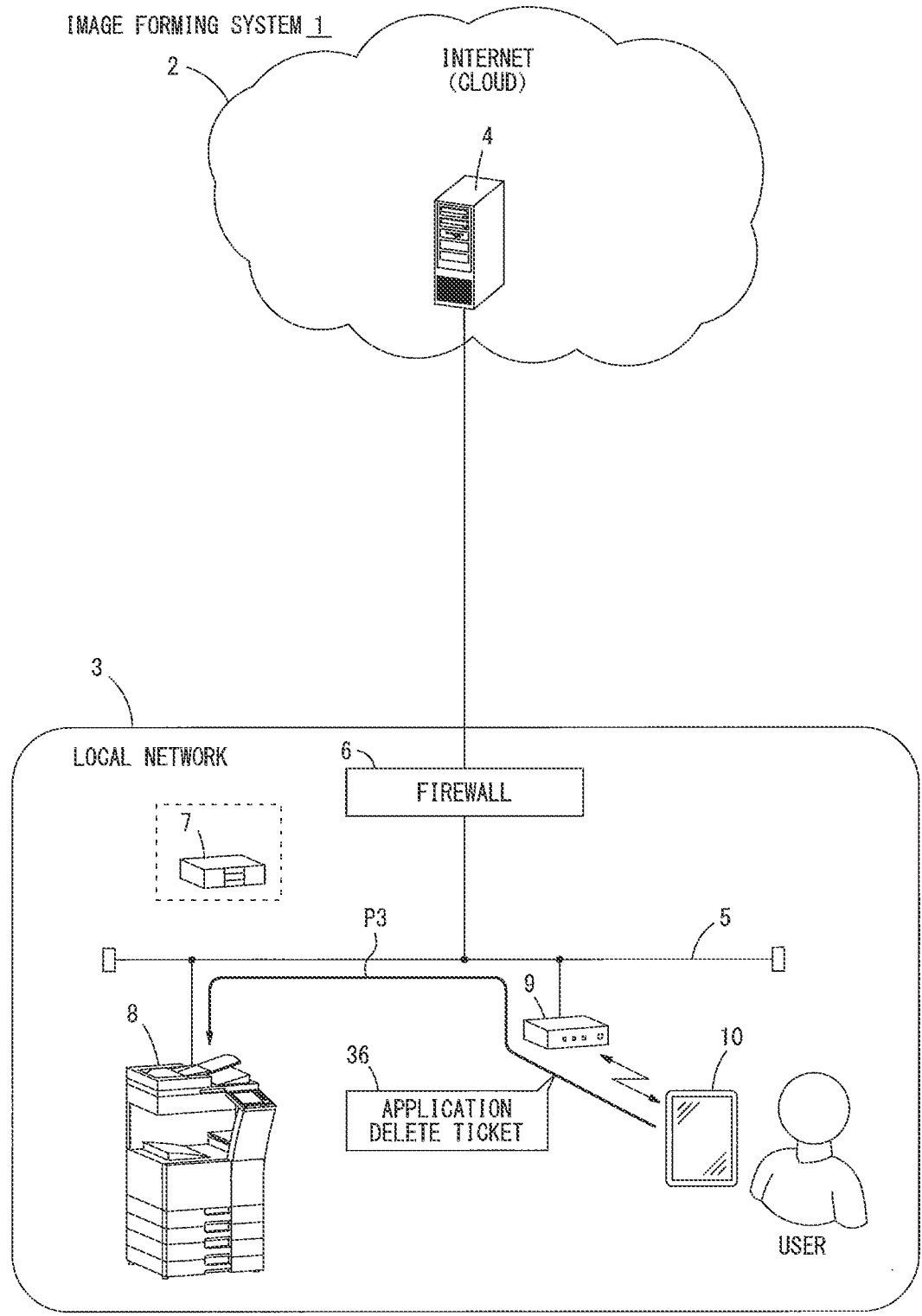
FIG. 7 explains the first method of deleting the application on the image forming device.

FIGS. 6 and 7 explain the first method of deleting the application 12 on the image forming device 8. As illustrated in FIG. 6, the user who carries the information processing terminal 10 boots the application 13 outside the office, and he or she uses the information processing terminal 10 to access the internet 2, for instance, over communication lines of cellular phones and gain an access to the service providing server 4 (process P1). In response to the access from the information processing terminal 10, the service providing server 4 performs the user authentication of the user who uses the information processing terminal 10. The information of the user may be registered with the user registration information 11 and it may be after the service termination date and time of the service available for the user. In such a case, the service providing server 4 determines whether or not the issuance of the application delete ticket is required by referring the ticket management information 11f of the user registration information 11. The service providing server 4 may determine the issuance of the application delete ticket is required, then it sends the application delete ticket 36 to the information processing terminal 10 as shown in FIG. 6 (process P2). More specifically, the information processing terminal 10 obtains the application delete ticket 36 from the service providing server 4 and stores therein in communication environment different from the local network 3.

The user then returns to the office as illustrated in FIG. 7, and the information processing terminal 10 becomes available to communicate with the wireless communication device 9. The information processing terminal 10 then connects to the local network 3. After connecting to the local network 3, the information processing terminal 10 sends the application delete ticket 36 stored in the storage unit 34 to the image forming device 8 over the local network 3 (process P3). In response to receiving the application delete ticket 36 from the information processing terminal 10, the image forming device 8 deletes the unnecessary application 12.

Figure 8:
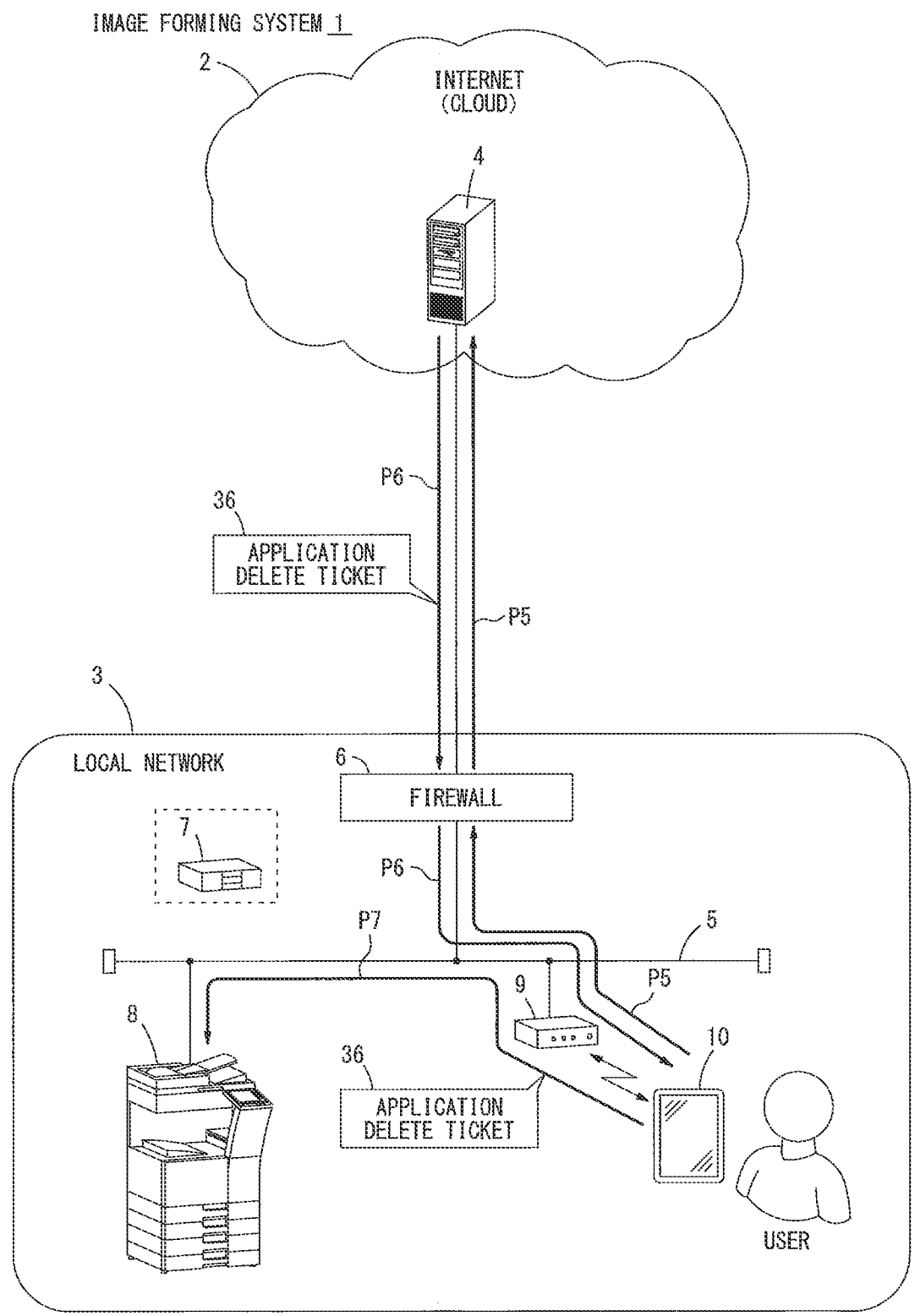
FIG. 8 explains a second method of deleting the application on the image forming device.

FIG. 8 explains the second method of deleting the application 12 on the image forming device 8. As illustrated in FIG. 8, the user boots the application 13 on the information processing terminal 10 as the information processing terminal 10 is connected to the local network 3. The information processing terminal 10 then accesses the internet 2 over the local network 3, and gains an access to the service providing server 4 (process P5). In response to the access from the information processing terminal 10, the service providing server 4 performs the user authentication as described above, and determines whether or not the issuance of the application delete ticket is required. The service providing server 4 may determine the issuance of the application delete ticket is required, then it issues and sends the application delete ticket 36 to the information processing terminal 10 as shown in FIG. 8 (process P6). The application delete ticket 36 is sent to the information processing terminal 10 as a response to the access from the information processing terminal 10. The application delete ticket 36 thereby sent from the service providing server 4 reaches the information processing terminal 10 on the local network 3 by passing through the internet 2 and the firewall 6. To be more specific, the information processing terminal 10 obtains the application delete ticket 36 from the service providing server 4 as it is connecting to the local network 3. The information processing terminal 10 has already been connected to the local network 3. Hence, in response to receiving the application delete ticket 36 from the service providing server 4, the information processing terminal 10 sends the received application delete ticket 36 to the image forming device 8 (process P7). After receiving the application delete ticket 36 from the information processing terminal 10, the image forming device 8 deletes the unnecessary application 12.

For deleting the application 12 on the image forming device 8 with the second way, the information processing terminal 10 is not necessary a portable device such as a smartphone or a tablet terminal. As a result, the information processing terminal 10 may be a device such as a general personal computer connected to the internal LAN 5 of the local network 3, for instance.

Figure 9:
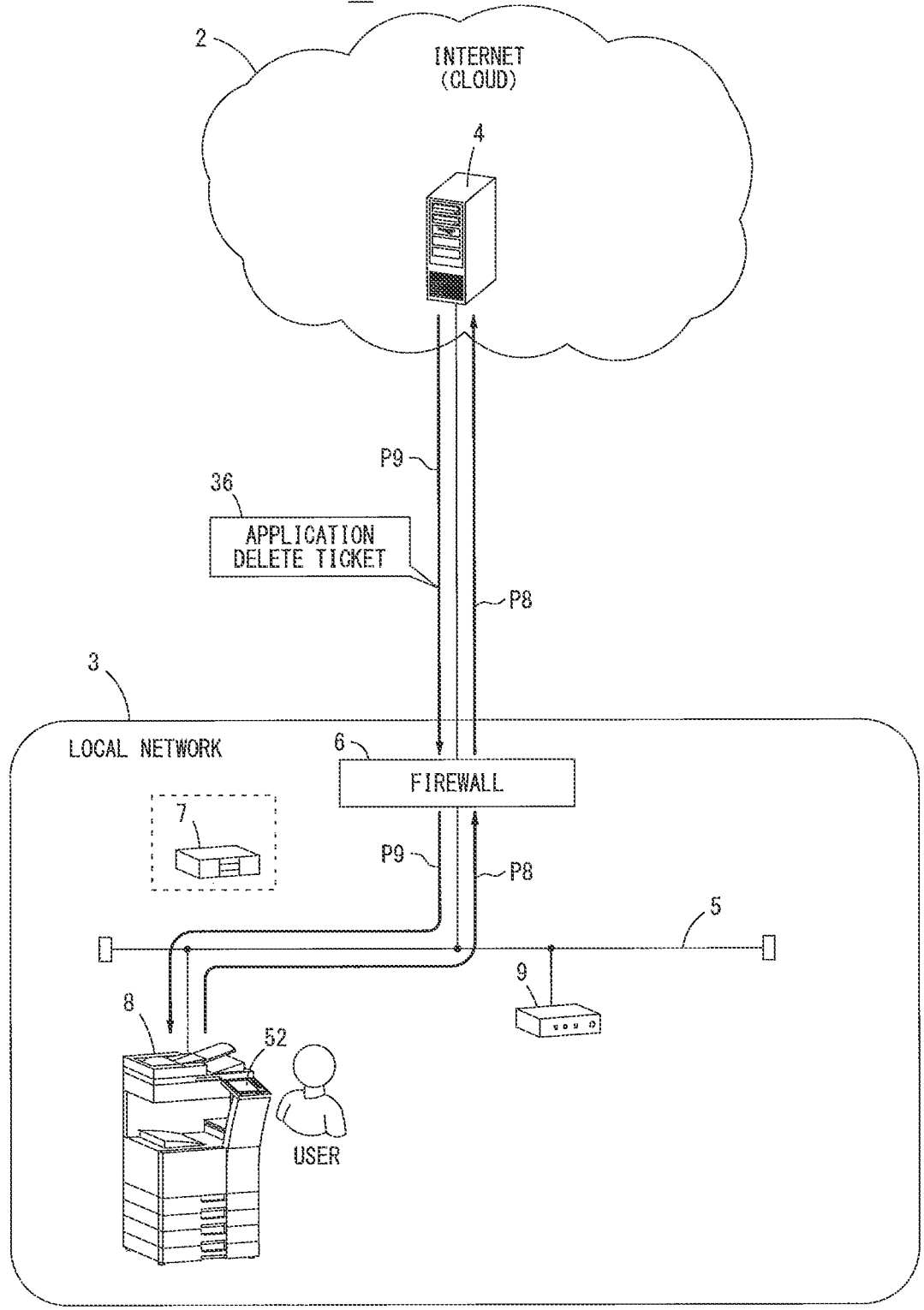
FIG. 9 explains a third method of deleting the application on the image forming device.

FIG. 9 explains the third method of deleting the application 12 on the image forming device 8. As illustrated in FIG. 9, the user uses the image forming device 8 and boots the application 12 on the image forming device 8 to cause it to execute the job by using the service provided by the service providing server 4. The image forming device 8 then accesses the internet 2 over the local network 3, and gains an access to the service providing server 4 (process P8). In response to the access from the image forming device 8, the service providing server 4 performs the user authentication as described above, and determines whether or not the issuance of the application delete ticket is required. The service providing server 4 may determine the issuance of the application delete ticket is required. In this case, the service providing server 4 issues the application delete ticket 36, and sends to the image forming device 8 as shown in FIG. 9 (process P9). Also in this case, the application delete ticket 36 is sent to the image forming device 8 as a response to the access from the image forming device 8. The application delete ticket 36 thereby sent reaches directly to the image forming device 8 by passing through the internet 2 and the firewall 6. To be more specific, the image forming device 8 obtains the application delete ticket 36 directly from the service providing server 4 in response to gaining the access to the service providing server 4. The image forming device 8 deletes the unnecessary application 12 based on the application delete ticket 36 obtained from the service providing server 4.

The image forming system 1 of the present preferred embodiment is capable of deleting normally the application 12 which has already been unnecessary on the image forming device 8 when the relay server 7 is removed from the local network 3 with any way of the aforementioned first, second and third ways.

Figure 10:
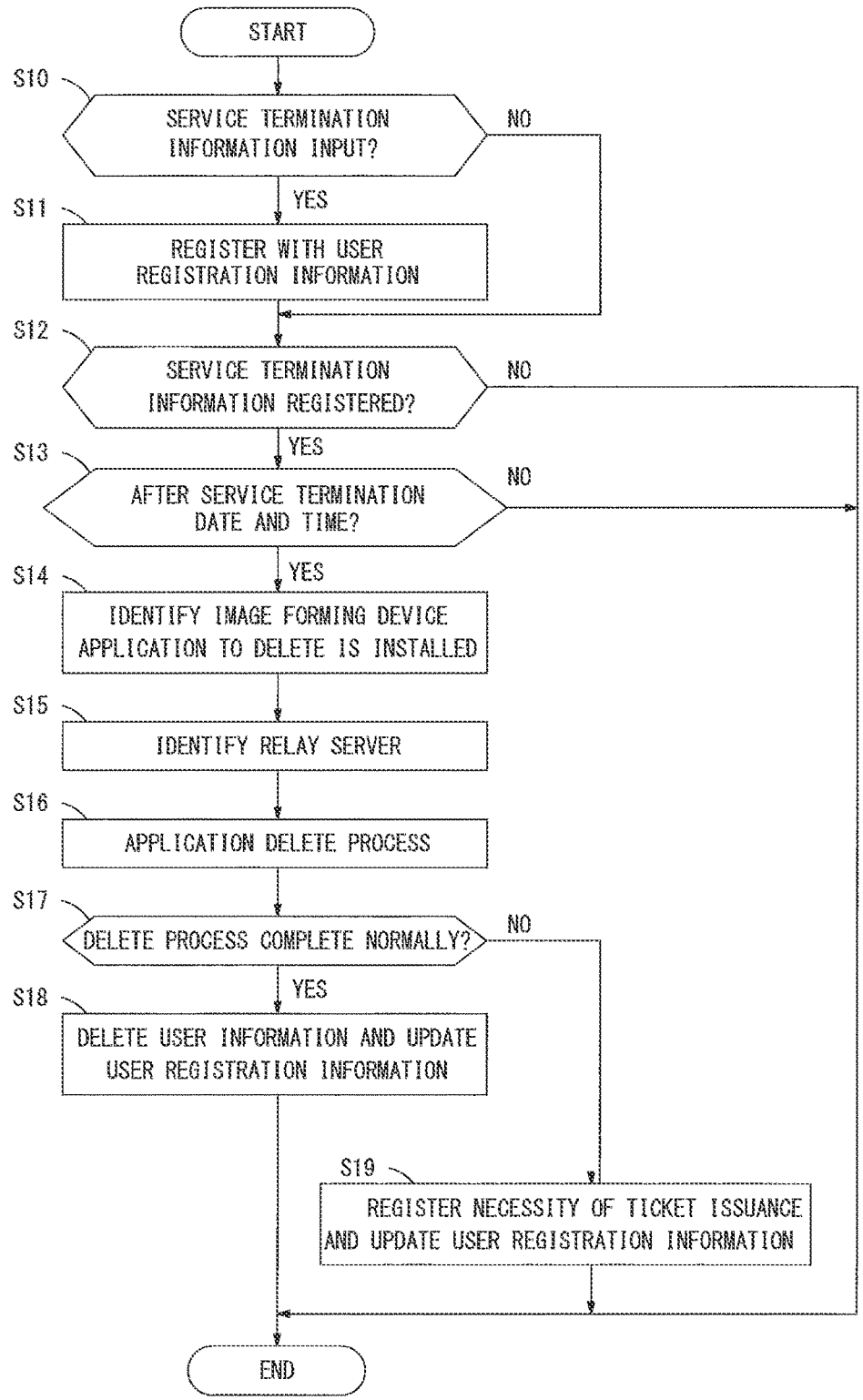
FIG. 10 is a flow diagram explaining the exemplary sequential procedure of a first process performed at the service providing server.

The detailed sequential procedure of the process performed at each device forming the image forming system 1 is described next. FIG. 10 is a flow diagram explaining the exemplary sequential procedure of the first process performed at the service providing server 4. The first process is performed based on the service termination information input by the service provider by the controller 20 of the service providing server 4 repeatedly on a periodical basis. The first process is one of the processes performed when the controller 20 of the service providing server 4 executes the program 29. The information managing part 23 and the deleting part 25 of the controller 20 are brought into operation, and the process is performed.

After starting the first process, the service providing server 4 determines whether or not the service termination information is received (step S10). If the service termination information is received (when a result of step S10 is YES), the service providing server 4 registers the information such as the service termination date and time with the user registration information 11 based on the received service termination information (step S11).

The service providing server 4 then determines whether or not the service termination information is registered with the user registration information 11 (step S12). The service termination information may be registered with the user registration information 11. In this case, the service providing server 4 determines if it is after the service termination date and time (step S13). If it is after the service termination date and time (when a result of step S13 is YES), the service providing server 4 refers the user registration information 11, thereby identifying the image forming device 8 on which the application 12 to delete is installed (step S14), also identifying the relay server 7 to establish the communication with the identified image forming device 8 (step S15). The service providing server 4 then starts establishing communication with the image forming device 8 via the identified relay server 7, and performs the application delete process to delete the application 12 on the image forming device 8 (step S16). The service providing server 4 determines if the delete process is complete normally (step S17). When the application 12 on the image forming device 8 is deleted normally (when a result of step S17 is YES), the service providing server 4 deletes the user information of the user who has been terminated to use the service and updates the user registration information 11 (step S18).

The communication may not be established with the relay server 7 and the delete process of the application 12 may be resulted in failure (when a result of step S17 is NO). In this case, the service providing server 4 registers that it has failed to delete the application 12 with application information 11e of the user registration information 11 and that the issuance of the ticket is necessary with the ticket management information 11*f*, then updates the user registration information 11 (step S19). Thus, it is ready for issuance of the application delete ticket 36.

Figure 11:
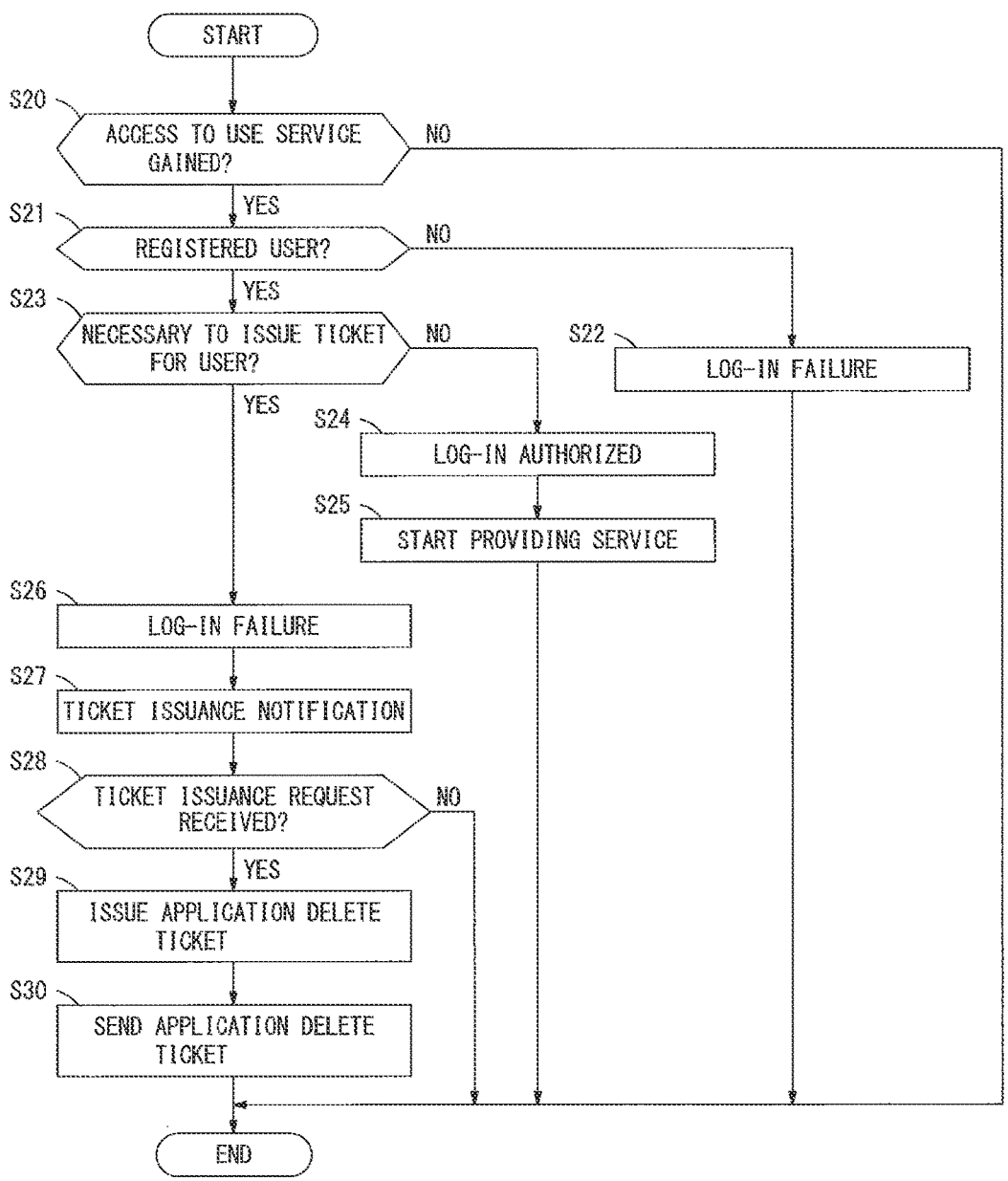
FIG. 11 is a flow diagram explaining the exemplary sequential procedure of a second process performed at the service providing server.

FIG. 11 is a flow diagram explaining the exemplary sequential procedure of the second process performed at the service providing server 4. The second process is performed to issue the application delete ticket 36 when the access is gained from the information processing terminal 10 or the image forming device 8 to use the service. The second process is performed by the controller 20 of the service providing server 4 repeatedly on a periodical basis. The second process is also one of the processes performed when the controller 20 of the service providing server 4 executes the program 29. The service providing part 24 and the deleting part 25 of the controller 20 are brought into operation, and the process is performed.

After starting the second process, the service providing server 4 determines whether or not the access to use the service is detected (step S20). If the access is detected (when a result of step S20 is YES), the service providing server 4 determines if the access user is registered as the service user with the user registration information 11 (step S21). If the user is not the registered user (when a result of step S21 is NO), the log-in is resulted in failure (step S22). The service providing server 4 completes the process without starting providing the service.

The user may be the registered user (when a result of step S21 is YES), the service providing server 4 refers the ticket management information 11*f* of the user registration information 11, thereby determining if it is necessary to issue the application delete ticket 36 for the registered user (step S23). If it is not necessary to issue the application delete ticket 36 for the registered user (when a result of step S23 is NO), the service providing server 4 allows the log-in of the registered user (step S24), then starts providing the service (step S25).

If it is necessary to issue the application delete ticket 36 for the registered user (when a result of step S23 is YES), the service providing server 4 does not allow the log-in of the registered user (step S26). The service providing server 4 does not provide the service. The service providing server 4 then performs a ticket issuance notification process (step S27). The ticket issuance notification process is performed to notify the device which has gained the access (more specifically, the information processing terminal 10 or the image forming device 8) of the issuance of the application delete ticket 36. To be more specific, the service providing server 4 sends the notification information to the information processing terminal 10 or the image forming device 8, thereby notifying of the issuance of the application delete ticket 36.

Figure 12:
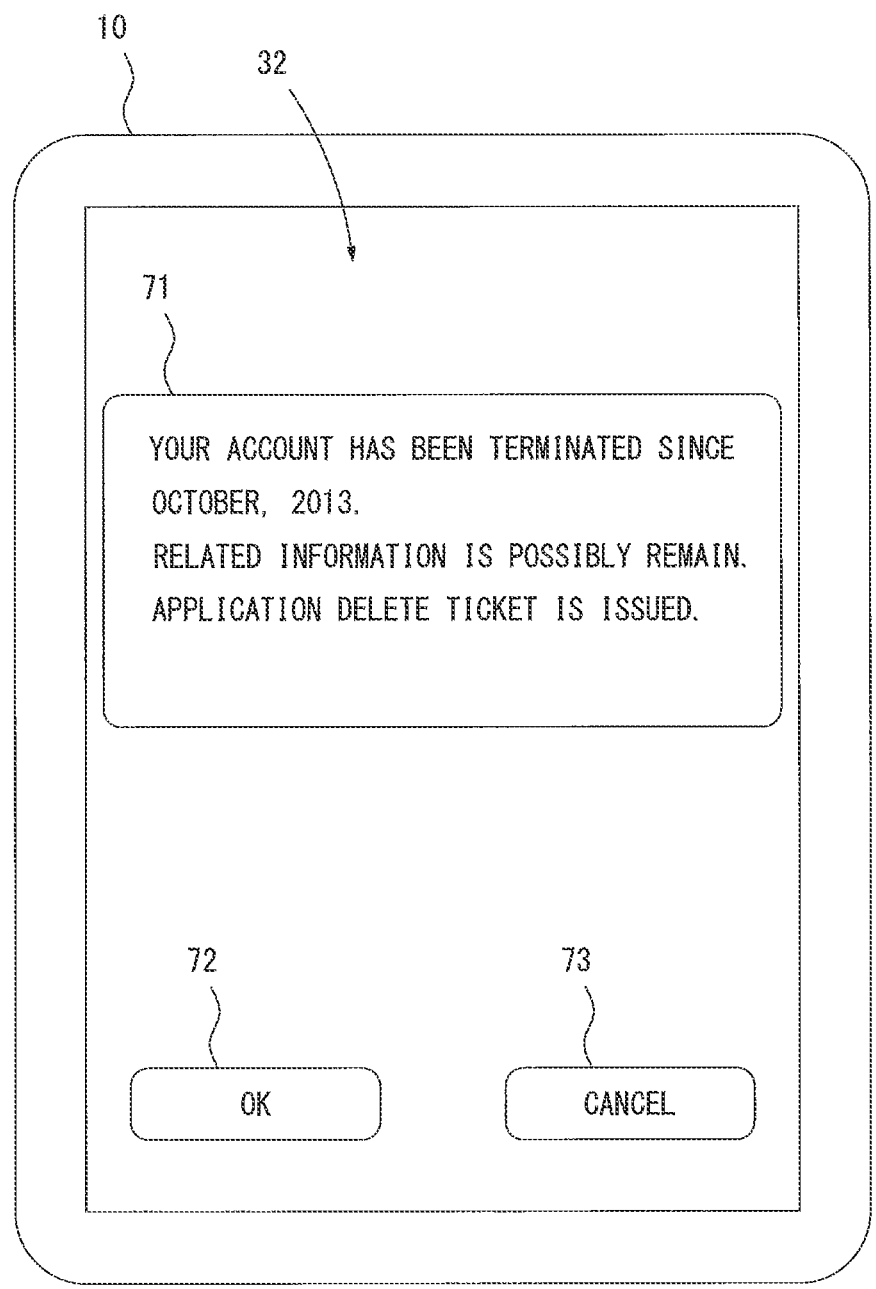
FIG. 12 shows an example of a notification screen displayed based on notification information at the information processing terminal.

FIG. 12 shows an example of the notification screen displayed based on the notification information at the information processing terminal 10. In response to receiving the notification information from the service providing server 4, the information processing terminal 10 displays the notification screen as illustrated in FIG. 12 on the display unit 32 based on the notification information. The notification screen includes a message 71 notifying of the issuance of the application delete ticket and operation keys 72 and 73 either of them may be operated by the user. The user may select and touch the operation key 72. In this case, the information processing terminal 10 sends a ticket issuance request to the service providing server 4. The user may select and touch the operation key 73. In this case, the information processing terminal 10 does not send the ticket issuance request to the service providing server 4. The same notification screen is displayed when the image forming device 8 receives the notification information from the service providing server 4.

After the ticket issuance notification process, the service providing server 4 determines whether or not the ticket issuance request is received (step S28). In response to receiving the ticket issuance request (when a result of step S28 is YES), the service providing server 4 issues the application delete ticket 36 (step S29), then sends the issued application delete ticket 36 to the device which has gained the access (more specifically, the information processing terminal 10 or the image forming device 8) (step S30). The predetermined period of time may elapse without receipt of the ticket issuance request. In such a case, the service providing server 4 completes the process without issuing the application delete ticket 36.

Through the above-described procedure of the process, the notification screen is displayed at the information processing terminal 10 or the image forming device 8, so that the user is asked whether or not to issue the application delete ticket 36, and when the user gives an instruction to request for issuance of the application delete ticket 36, the application delete ticket 36 is issued. The user may have scheduled to temporarily terminate the service for a predetermined period of time, for instance, and start the service again later. In this case, the application 12 installed on the image forming device 8 is made available after the predetermined period of time. Hence, the application 12 is not necessary to be deleted from the image forming device 8. In the flow diagram of FIG. 11, the application delete ticket 36 is issued only if the user gives the instruction to request for issuance of the application delete ticket 36. It is not necessary to wait for the user instruction for issuance of the ticket. The user who has gained the access by using the information processing terminal 10 or the image forming device 8 is the user for whom the ticket is to be issued. The application delete ticket 36 then may be issued and sent to the device which has gained the access without making an inquiry to the user.

Figure 13:
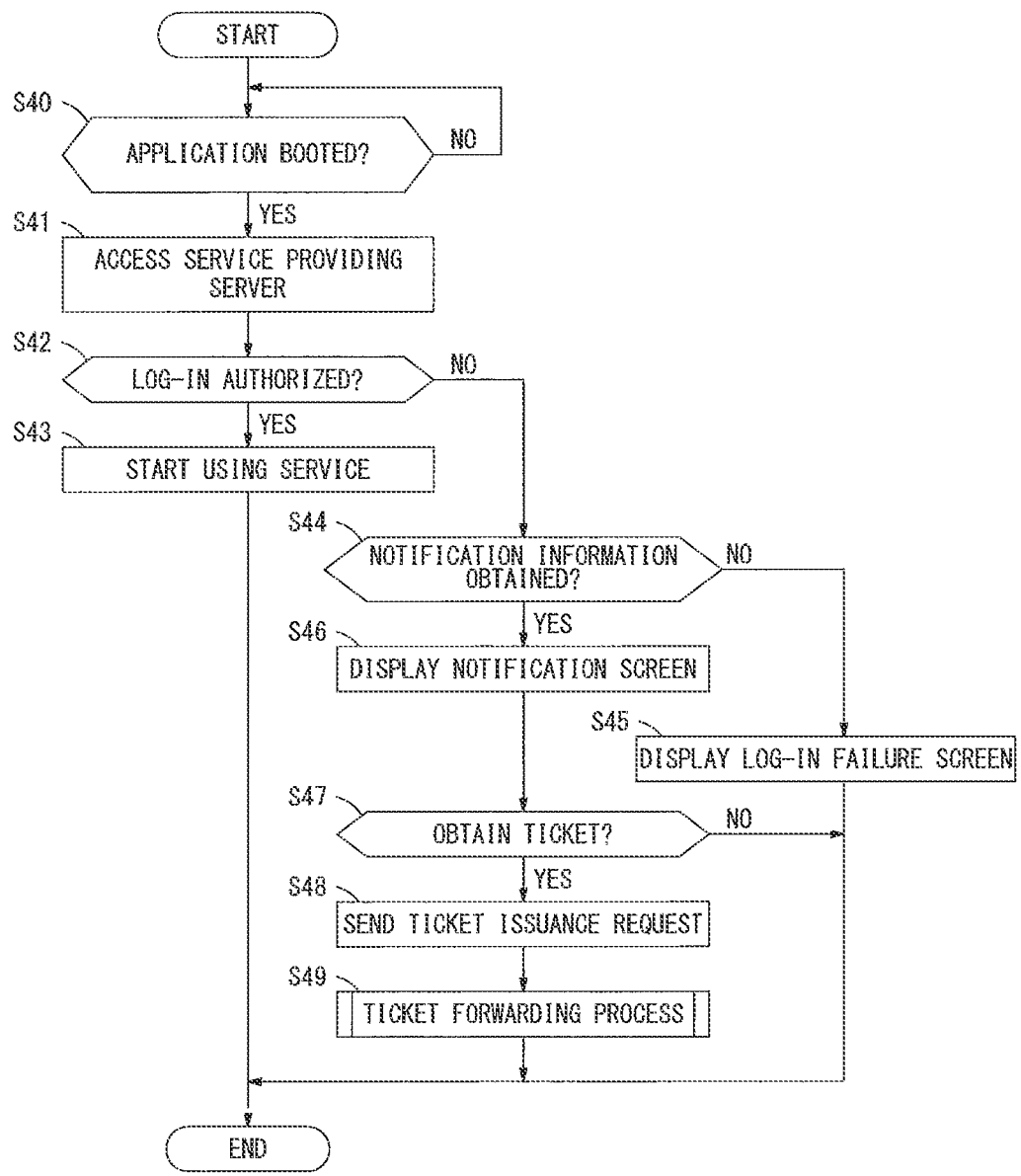
FIG. 13 is a flow diagram explaining the exemplary sequential procedure of the process performed at the information processing terminal.
Figure 14:
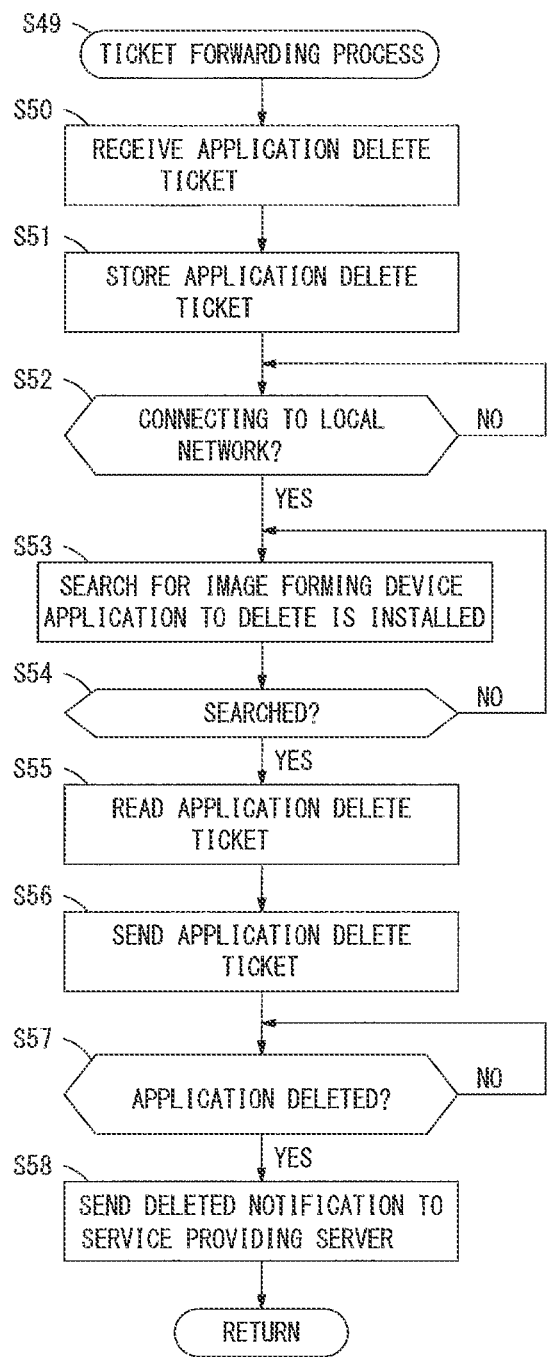
FIG. 14 is a flow diagram explaining the exemplary sequential procedure of the process performed at the information processing terminal.

FIGS. 13 and 14 are flow diagrams explaining the exemplary sequential procedure of the process performed at the information processing terminal 10. The process is performed when the controller 30 of the information processing terminal 10 executes the application program 35 and the server connecting part 41, the ticket managing part 42, the device detecting part 43 and the ticket forwarding part 44 become operative.

After the information processing terminal 10 starts this process and completes booting the application 13 (when a result of step S40 is YES), the server connecting part 41 becomes operative to function to access the service providing server 4 (step S41). The information processing terminal 10 determines whether or not the log-in is authorized as a result of the user authentication at the service providing server 4 (step S42). When the log-in is authorized (when a result of step S42 is YES), the information processing terminal 10 starts using the service provided by the service providing server 4 (step S43).

The log-in may be restricted (when a result of step S42 is NO). In this case, the information processing terminal 10 determines if the notification information is obtained (step S44). If the notification information is not obtained (when a result of step S44 is NO), the information processing terminal 10 displays a log-in failure screen and completes the process (step S45). When the notification information is obtained (when a result of step S44 is YES), the information processing terminal 10 displays the notification screen as illustrated in FIG. 12 on the display unit 32 (step S46). The information processing terminal 10 then determines whether or not to obtain the application delete ticket 36 based on the user instruction (step S47). For obtaining the ticket (when a result of step S47 is YES), the information processing terminal 10 sends the ticket issuance request to the service providing server 4 (step S48). The information processing terminal 10 then performs a ticket forwarding process (step S49).

FIG. 14 is a flow diagram explaining the detailed exemplary sequential procedure of the ticket forwarding process (step S49). After starting the ticket forwarding process, the information processing terminal 10 receives the application delete ticket 36 from the service providing server 4 (step S50), and stores the received application delete ticket 36 in the storage unit 34. The information processing terminal 10 is put into a standby state until the connection to the local network 3 is established (step S52). After it is detected that the connection to the local network 3 is established (when a result of step S52 is YES), the information processing terminal 10 starts a search process of the image forming device 8 on which the application 12 to delete is installed (step S53). In the search process, a polling to the image forming device 8 is sent to the local network 3, and the image forming device 8 on which the application 12 to delete is installed is searched based on the response from the image forming device 8. The search process is repeatedly performed until the image forming device 8 on which the application 12 to delete is installed is found (when a result of step S54 is NO). The image forming device 8 on which the application 12 to delete is installed is extracted, and the search process is complete (when a result of step S54 is YES). The information processing terminal 10 then reads the application delete ticket 36 in the storage unit 34 (step S55), and sends the read application delete ticket 36 to the image forming device 8 (step S56). The information processing terminal 10 is put into the standby state until the delete process of the application 12 performed at the image forming device 8 is complete (step S57). Once the delete process is complete (when a result of step S57 is YES), the information processing terminal 10 sends a deleted notification to the service providing server 4 (step S58).

The above-described process is performed at the information processing terminal 10 so that the information processing terminal 10 is allowed to store the application delete ticket 36 after it receives the application delete ticket 36 from the service providing server 4 in response to gaining an access to the service providing server 4. Once the communication with the image forming device 8 is allowed, the information processing terminal 10 sends the application delete ticket 36 to the image forming device 8, thereby deleting the application 12 installed on the image forming device 8.

Figure 15:
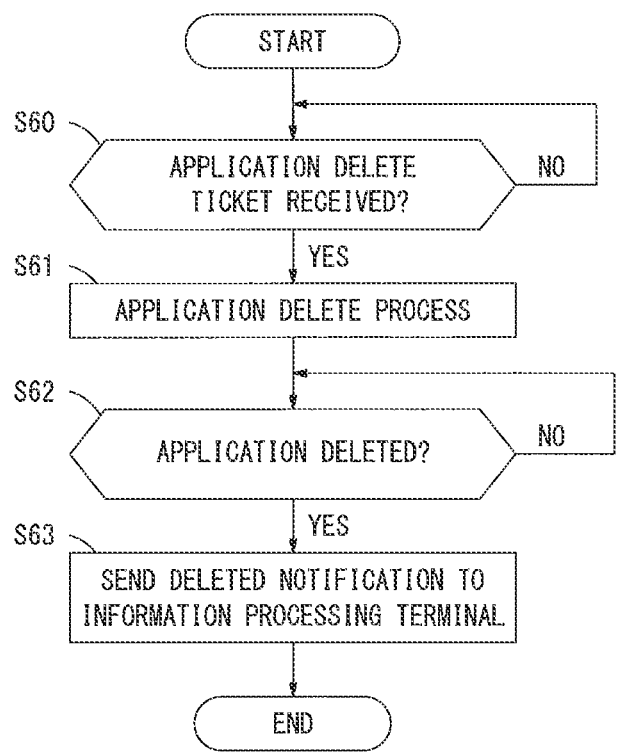
FIG. 15 is a flow diagram explaining the exemplary sequential procedure of the process performed at the image forming device in response to receiving an application delete ticket from the information processing terminal.

FIG. 15 is a flow diagram explaining the exemplary sequential procedure of the process performed at the image forming device 8 in response to receiving the application delete ticket 36 from the information processing terminal 10. The process is performed when the controller 50 of the image forming device 8 executes the application program 56 and the ticket receiving part 62, the deleting part 63 and the notifying part 64 become operative. After receiving the application delete ticket 36 from the information processing terminal 10 (when a result of step S60 is YES), the image forming device 8 performs the delete process of the application 12 based on the application delete ticket 36 (step S61). In response to completing the delete process of the application 12 (when a result of step S62 is YES), the image forming device 8 notifies the information processing terminal 10 that the application 12 is deleted (step S63). With the above-described process performed at the image forming device 8, the application 12 may be deleted even when the application delete ticket 36 is received indirectly from the information processing terminal 10.

Figure 16:
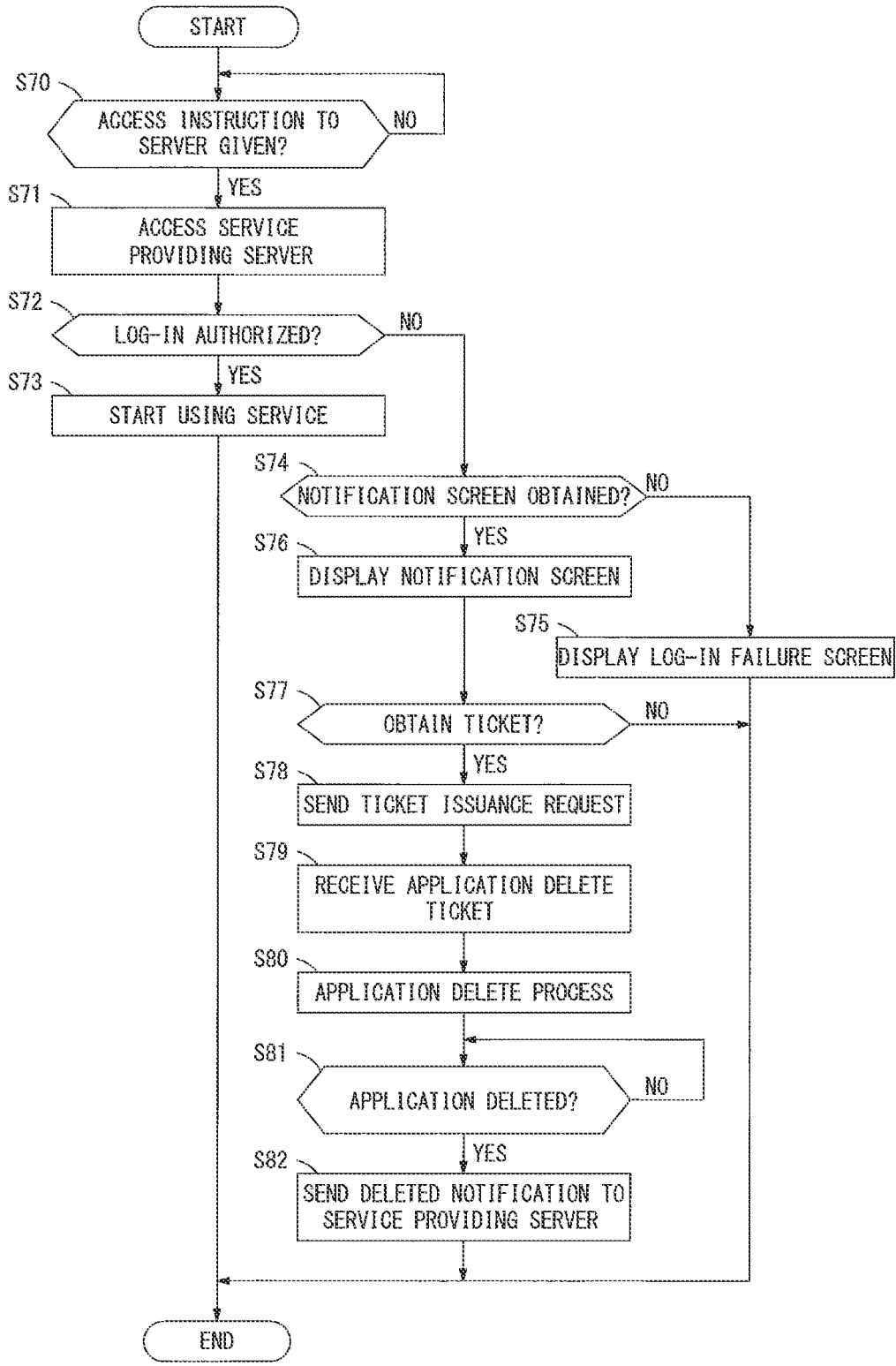
FIG. 16 is a flow diagram explaining the exemplary sequential procedure of the process performed at the image forming device when a user gains an access to the service providing server by using the image forming device.

FIG. 16 is a flow diagram explaining the exemplary sequential procedure of the process performed at the image forming device 8 when the user gains the access to the service providing server 4 by using the image forming device 8. The process is performed when the controller 50 of the image forming device 8 executes the application program 56 and the server connecting part 61, the ticket receiving part 62, the deleting part 63 and the notifying part 64 become operative.

After detecting the access instruction to the service providing server 4 given by the user (when a result of step S70 is YES), the server connecting part 61 becomes operative to function to gain the access to the service providing server 4 (step S71). The image forming device 8 determines whether or not the log-in is authorized as a result of the user authentication at the service providing server 4 (step S72). The log-in may be authorized (when a result of step S72 is YES), the image forming device 8 starts using the service provided by the service providing server 4 (step S73).

The log-in may be resulted in failure (when a result of step S42 is NO). In this case, the image forming device 8 determines if the notification information is obtained (step S74). When the notification information is not obtained (when a result of step S74 is NO), the image forming device 8 displays the log-in failure screen and completes the process (step S75). When the notification information is obtained (when a result of step S74 is YES), the image forming device 8 displays the notification screen as the same as the one of FIG. 12 on the display unit 53 of the operational panel 52 (step S76). The image forming device 8 determines whether or not to obtain the application delete ticket 36 based on the user instruction (step S77). The ticket may be obtained (when a result of step S77 is YES). In this case, the image forming device 8 sends the ticket issuance request to the service providing server 4 (step S78). The image forming device 8 then receives the application delete ticket 36 from the service providing server 4 (step S79). The image forming device 8 performs the delete process of the application 12 based on the received application delete ticket 36 (step S80). In response to completing the delete process of the application 12 (when a result of step S81 is YES), the image forming device 8 sends the deleted notification of the application 12 to the service providing server 4 (step S82). With the above-described process performed at the image forming device 8, the application 12 may be deleted even when the application delete ticket 36 is received directly from the service providing server 4.

It is assumed that the application 12 to use the service provided by the service providing server 4 is installed on the image forming device 8 on the local network 3, and the service providing server 4 is not allowed to delete the application 12 by accessing from outside of the local network 3 when the service is terminated. As described above, in this case, on the image forming system 1 of the present preferred embodiment, the application delete ticket 36 is issued when the access from the information processing terminal 10 or the image forming device 8 used on the local network 3 is detected, and it is sent to the information processing terminal 10 or the image forming device 8. The application delete ticket 36 may be received indirectly via the information processing terminal 10, or directly from the service providing server 4. In both cases, the image forming device 8 deletes the application 12 based on the application delete ticket 36. Even when the service providing server 4 is not allowed to delete the application 12 by accessing the image forming device 8 from outside of the local network 3, the service provider is allowed to delete the application 12 on the image forming device 8 without visiting the installation site of the image forming device 8 connected to the user's local network 3.

If the relay server 7 is kept being connected to the local network 3, the service providing server 4 is capable of accessing the image forming device 8 from outside of the local network 3 over the firewall 6 by using the connection with the relay server 7. Thus, the service providing server 4 is allowed to delete the application 12 on the image forming device 8 without entering the standby state until the detection of the access from the information processing terminal 10 or the image forming device 8 as described above.

As described above, the application on the image forming device installed on the user's local network may be deleted without requiring the service provider to visit the installation site of the image forming device at termination of the cloud service.

While the preferred embodiment of the present invention has been described above, the present invention is not limited to the preferred embodiment. Various modifications may be applied to the present invention.

According to the above-described preferred embodiment, for instance, only one image forming device 8 is installed on the local network 3. The number of the image forming device 8 installed on the local network 3 is not necessarily only one. Multiple image forming devices 8 may be installed on the local network 3. In such a case, when the information processing terminal 10 stores the application delete ticket 36 issued by the service providing server 4, it searches for each image forming device 8 on which the application 12 is installed from among the multiple image forming devices 8 installed on the local network 3. The information processing terminal 10 then sends the application delete ticket 36 to every image forming device 8 extracted through the search. As a result, even when the application 12 is installed on more than one image forming device 8, the information processing terminal 10 is allowed to delete all the application 12 installed on more than one image forming device 8 at once. It is assumed, for example, that one of the multiple image forming devices 8 directly receives the application delete ticket 36 from the service providing server 4. In this case, the one of the multiple image forming devices 8 deletes the application 12 installed on itself. Also, the image forming device 8 searches if there is any other image forming device 8 on which the application 12 is installed. If there is any, the image forming device 8 sends the application delete ticket 36 to another image forming device 8 extracted from the search. Thus, when the application 12 is installed on more than one image forming device 8, the image forming device 8 not only deletes the application 12 installed on itself but also the application 12 installed on the other image forming devices 8 at the same time.

What is claimed is:

1. An image forming system, comprising:
   a service providing server installed on an internet to provide a predetermined service; and
   an image forming device, installed on a local network connected to said internet via a firewall, storing therein an application to use said service installed in advance, wherein
   said service providing server includes:
      a managing part managing user registration information with which a service user who uses said service with said image forming device and said image forming device corresponding to the service user associated with each other are registered;
      a ticket issuing part issuing an application delete ticket to delete said application installed in advance on said image forming device when the service user registered with said user registration information terminates said service;
      a ticket sending part sending said application delete ticket to a device which has accessed said service providing server when the access from the service user, who is registered as the one who has terminated said service with said user registration information, is detected; and
      a relay server communication part establishing communication with said image forming device via a relay server when said relay server, which establishes a connection with said service providing server over said firewall, is installed on said local network,
   when the connection is established with said relay server, said application is deleted using the connection,
   said ticket issuing part issues said application delete ticket when said relay server communication part is not allowed to establish communication with said relay server, and
   said image forming device includes:
      a ticket receiving part receiving directly or indirectly said application delete ticket from said service providing server; and
      an application deleting part deleting said application based on said application delete ticket received by said ticket receiving part.

2. The image forming system according to claim 1, further comprising:
   an information processing terminal, which establishes communication with said service providing server by connecting to said internet and with said image forming device over said local network, used by the service user registered with said user registration information, wherein
   said information processing terminal includes:
      a server connecting part accessing said service providing server based on an instruction by the service user;
      a storage part storing therein said application delete ticket in response to receiving said application delete ticket from said service providing server after said server connecting part accesses said service providing server; and
      a sending part sending said application delete ticket in said storage part to said image forming device over said local network in response to detecting the communication with said image forming device over said local network is allowed; and
   said ticket receiving part receives said application delete ticket indirectly via said information processing terminal.

3. The image forming system according to claim 1, wherein
   said image forming device further includes: a server connecting part accessing said service providing server via said firewall, and
   said ticket receiving part receives said application delete ticket directly from said service providing server when said server connecting part accesses said service providing server.

4. The image forming system of claim 1 wherein the application deleting part further runs an uninstall program to delete said application delete ticket received by said ticket receiving part.

5. The image forming system of claim 4, wherein said uninstall program is attached to said application delete ticket.

6. The image forming system of claim 4, wherein said uninstall program is pre-stored on said image forming device.

7. A service providing server installed on an internet to provide a predetermined service, comprising:
- a managing part managing user registration information with which a service user and an image forming device, installed on a local network connected to said internet via a firewall and storing therein an application to use said service installed in advance, associated with each other are registered;
- a ticket issuing part issuing an application delete ticket, to delete said application installed in advance on said image forming device associated with the service user when he or she registered with said user registration information terminates said service; and
- a ticket sending part sending said application delete ticket to a device which has accessed said service providing server when the access from the service user, who is registered as the one who has terminated said service with said user registration information, is detected; and
- a relay server communication part establishing communication with said image forming device via a relay server when said relay server, which establishes a connection with said service providing server over said firewall, is installed on said local network, wherein when the connection is established with said relay server, said application is deleted using the connection, and said ticket issuing part issues said application delete ticket when said relay server communication part is not allowed to establish communication with said relay server.

8. The service providing server according to claim 7, wherein
said ticket sending part sends said application delete ticket to an information processing terminal in response to detecting the access from said information processing terminal used by the service user registered as the one who has terminated said service with said user registration information.

9. The service providing server according to claim 7, wherein
said ticket sending part sends said application delete ticket to said image forming device in response to detecting the access from said image forming device associated with the service user registered as the one who has terminated said service with said user registration information.

10. The service providing server according to claim 7, wherein
said managing part updates said user registration information in response to receiving a deleted notification of said application after said ticket sending part sends said application delete ticket.

11. The service providing server installed on an internet to provide a predetermined service of claim 7 wherein the application delete ticket includes an uninstall program attached thereto.

12. An image forming device installed on a local network connected to an internet via a firewall, comprising
- a storage part storing therein an application installed in advance to use a service provided by a service providing server installed on said internet;
- a ticket receiving part receiving directly or indirectly an application delete ticket from said service providing server; and
- a server connecting part accessing said service providing server via a relay server when said relay server, which establishes a connection with said service providing server over said firewall, is installed on said local network and said connection is established;
  - wherein said ticket receiving part receives said application delete ticket directly from said service providing server when said server connecting part accesses said service providing server when said connection via said server relay is established;
- a communication part establishing communication with an information processing terminal storing therein said application delete ticket issued by said service providing server;
  - wherein said ticket receiving part receives said application delete ticket indirectly from said information processing terminal with which said communication part establishes communication when said connection with said service providing server via said relay server is not established; and
- an application deleting part running an uninstall program to delete said application stored in said storage part based on said application delete ticket received by said ticket receiving part.

13. The image forming device according to claim 12, further comprising:
a notifying part sending an application deleted notification to said service providing server after said application is deleted by said application deleting part.

14. The image forming device of claim 12, wherein said uninstall program is attached to said application delete ticket.

15. The image forming device of claim 12, wherein said uninstall program is pre-stored on said storage part.

16. A non-transitory computer readable recording medium on which a program is recorded, said program executable on a service providing server installed on an internet to provide a predetermined service, said program causing said service providing server to execute the steps of:
(a) managing user registration information with which a service user and an image forming device, installed on a local network connected to said internet via a firewall and store therein an application to use said service installed in advance, associated with each other are registered;
(b) issuing an application delete ticket to delete said application installed in advance on said image forming device associated with the service user when he or she registered with said user registration information terminates said service; and
(c) sending said application delete ticket to a device which has accessed said service providing server when the access from the service user, who is registered as the one who has terminated said service with said user registration information, is detected; and
(d) establishing communication with said image forming device via a relay server when said relay server, which is capable of establishing a connection with said service providing server over said firewall, is installed on said local network; wherein when the connection is established with said relay server, said application is deleted using the connection, and said application delete ticket is issued when communication with said image forming device via a relay server is not established.

17. The program of claim 16 wherein the application delete ticket includes an uninstall program attached thereto.

18. A non-transitory computer readable recording medium on which a program is recorded, said program executable on an information processing terminal causing a service providing server installed on an internet to provide a predetermined service and an image forming device, installed on a local network connected to said internet via a firewall, storing therein an application to use said service installed in advance, to work together, said program causing said information processing terminal to execute the steps of:

(a) accessing said service providing server by connecting to said internet based on a user instruction;

(b) storing an application delete ticket to delete said application in a predetermined storage part in response to receiving said application delete ticket from said service providing server after gaining the access to said service providing server in step (a);

wherein said application delete ticket is received from said service providing server after said service providing server is not allowed to establish communication with said image forming device via a relay server;

wherein said image forming device communicates with said service providing server via said relay server when said relay server, which establishes a connection with said service providing server over said firewall, is installed on said local network; further wherein when the connection is established with said relay server, said application is deleted using the connection, and when communication with said service providing server via said relay server is not established said application delete ticket is issued by said service providing server to said information processing terminal; and (c) sending said application delete ticket to said image forming device over said local network in response to detecting the communication with said image forming device over said local network is allowed.

19. The program of claim 18 wherein the application delete ticket includes an uninstall program attached thereto.

20. A non-transitory computer readable recording medium on which a program is recorded, said program executable on an image forming device installed on a local network connected to an internet via a firewall, said program causing said image forming device to execute the steps of:

(a) storing in a predetermined storage part an application installed in advance to use a service provided by a service providing server installed on said internet;

(b) receiving directly or indirectly an application delete ticket from said service providing server;

wherein an application delete ticket from said service providing server is received directly from said service providing server when said service providing server establishes a connection with said image forming device via a relay server when said relay server, which establishes a connection with said service providing server over said firewall, is installed on said local network and said connection is established;

wherein an application delete ticket from said service providing server is received indirectly via an information processing terminal when said connection with said service providing server via said relay server is not established; and (c) running an uninstall program to delete said application stored in step (a) based on said application delete ticket received in step (b).

21. The non-transitory computer readable recording medium of claim 20, wherein said uninstall program is attached to said delete ticket.

22. The non-transitory computer readable recording medium of claim 20, wherein said uninstall program is pre-stored on said predetermined storage part.

* * * * *